US010043115B2

(12) United States Patent
Hirose

(10) Patent No.: US 10,043,115 B2
(45) Date of Patent: Aug. 7, 2018

(54) IMAGE FORMING APPARATUS FOR PRINTING IMAGE DATA GENERATED BY READING DOCUMENT, METHOD FOR CONTROLLING THE SAME, AND STORAGE MEDIUM STORING COMPUTER PROGRAM FOR EXECUTING THE METHOD

(71) Applicant: CANON KABUSHIKI KAISHA, Tokyo (JP)

(72) Inventor: Fumiaki Hirose, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/139,109

(22) Filed: Apr. 26, 2016

(65) Prior Publication Data
US 2016/0328634 A1    Nov. 10, 2016

(30) Foreign Application Priority Data

May 8, 2015   (JP) ................................. 2015-095884
Jul. 21, 2015  (JP) ................................. 2015-144395

(51) Int. Cl.
*G06K 15/02*     (2006.01)
*H04N 1/21*      (2006.01)
*H04N 1/00*      (2006.01)
*H04N 1/32*      (2006.01)

(52) U.S. Cl.
CPC ..... *G06K 15/1809* (2013.01); *H04N 1/00795* (2013.01); *H04N 1/2104* (2013.01); *H04N 1/2158* (2013.01); *H04N 1/32358* (2013.01); *H04N 1/32443* (2013.01); *H04N 1/32448* (2013.01); *H04N 1/32454* (2013.01); *H04N 1/32491* (2013.01); *H04N 2201/0094* (2013.01); *H04N 2201/3287* (2013.01); *H04N 2201/3288* (2013.01)

(58) Field of Classification Search
CPC ........... G06K 15/1809; H04N 1/00795; H04N 1/2104; H04N 1/2158; H04N 1/32358; H04N 1/32443; H04N 1/32448; H04N 1/32454; H04N 1/32491; H04N 2201/0094; H04N 2201/3287; H04N 2201/3288
See application file for complete search history.

(56) References Cited

U.S. PATENT DOCUMENTS

| 6,480,297 | B1 * | 11/2002 | Suzuki | H04N 1/00915 358/1.1 |
| 8,189,227 | B2 * | 5/2012 | Uchida | H04N 1/32502 348/231.1 |
| 2001/0024298 | A1 * | 9/2001 | Yoshida | H04N 1/21 358/444 |
| 2006/0132821 | A1 | 6/2006 | Nonaka | |
| 2009/0177916 | A1 * | 7/2009 | Tokoro | G06F 11/2056 714/6.12 |

(Continued)

FOREIGN PATENT DOCUMENTS

| JP | 2001243023 A | 9/2001 |
| JP | 2002-218188 A | 8/2002 |
| JP | 2015-5950 A | 1/2015 |

*Primary Examiner* — Iriana Cruz
(74) *Attorney, Agent, or Firm* — Canon U.S.A., Inc. IP Division

(57) ABSTRACT

A printing apparatus for shortening the time required to read documents having a plurality of pages, while preventing the occurrence of an overflow in a storage unit.

12 Claims, 20 Drawing Sheets

(56) References Cited

U.S. PATENT DOCUMENTS

| | | | |
|---|---|---|---|
| 2012/0069363 A1* | 3/2012 | Nohdomi | H04N 1/00567 358/1.9 |
| 2013/0246711 A1* | 9/2013 | Testardi | G06F 11/1453 711/135 |
| 2015/0262043 A1* | 9/2015 | Saeki | G06F 3/1208 358/3.24 |
| 2016/0088189 A1* | 3/2016 | Atsumi | H04N 1/41 358/1.17 |

* cited by examiner

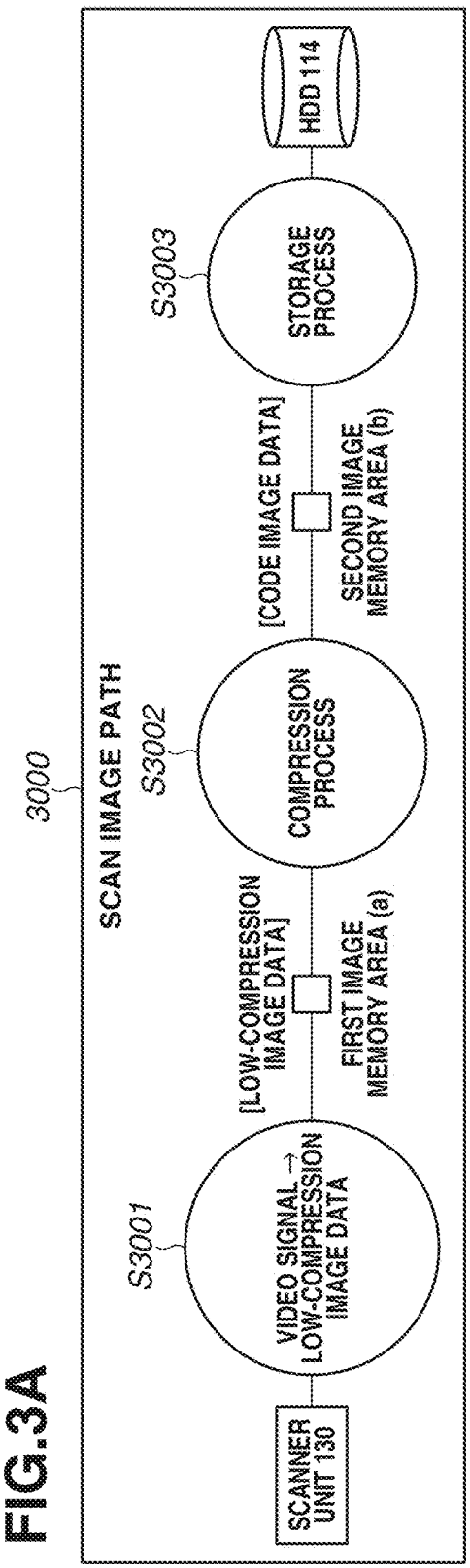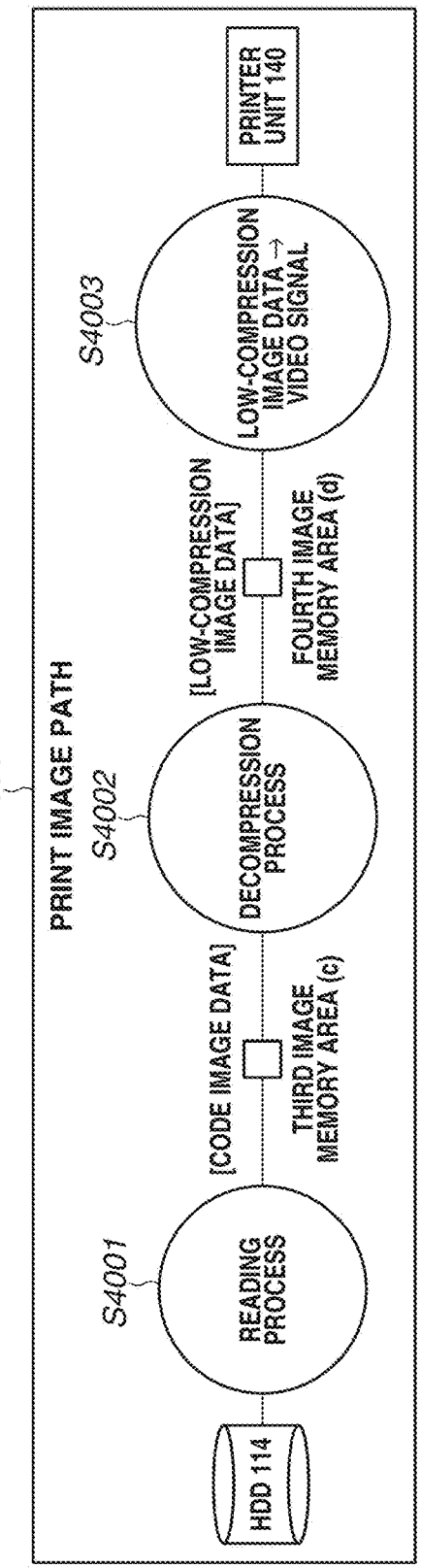

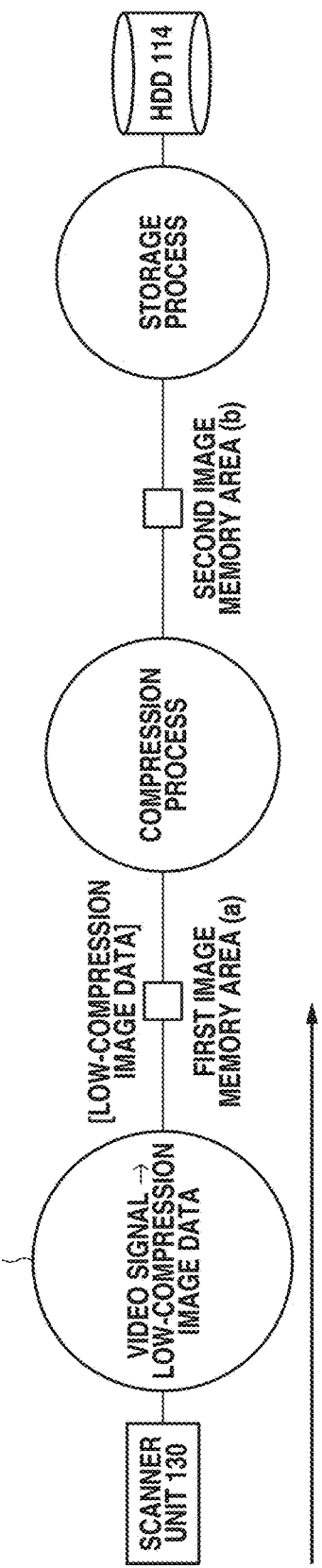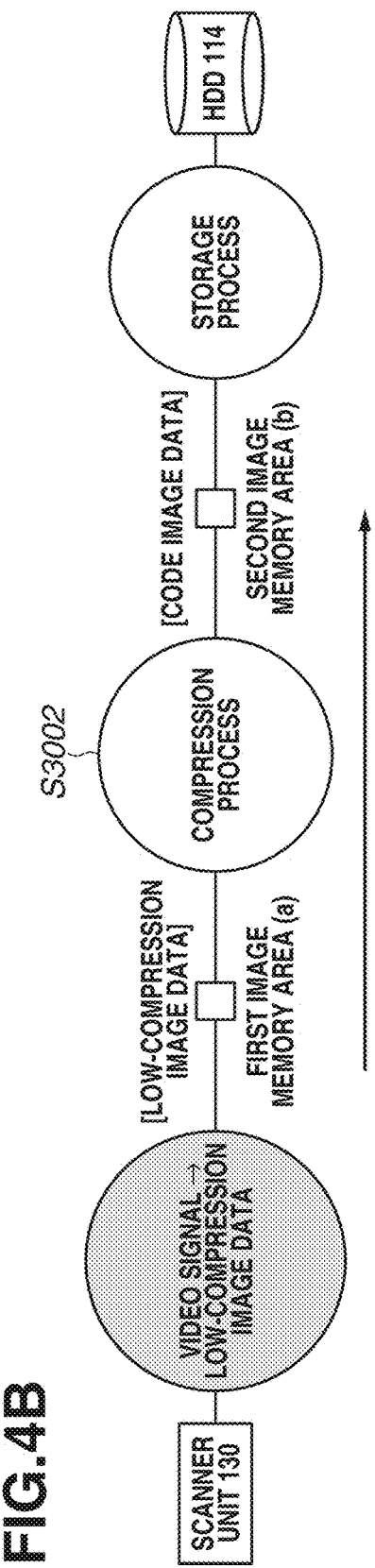

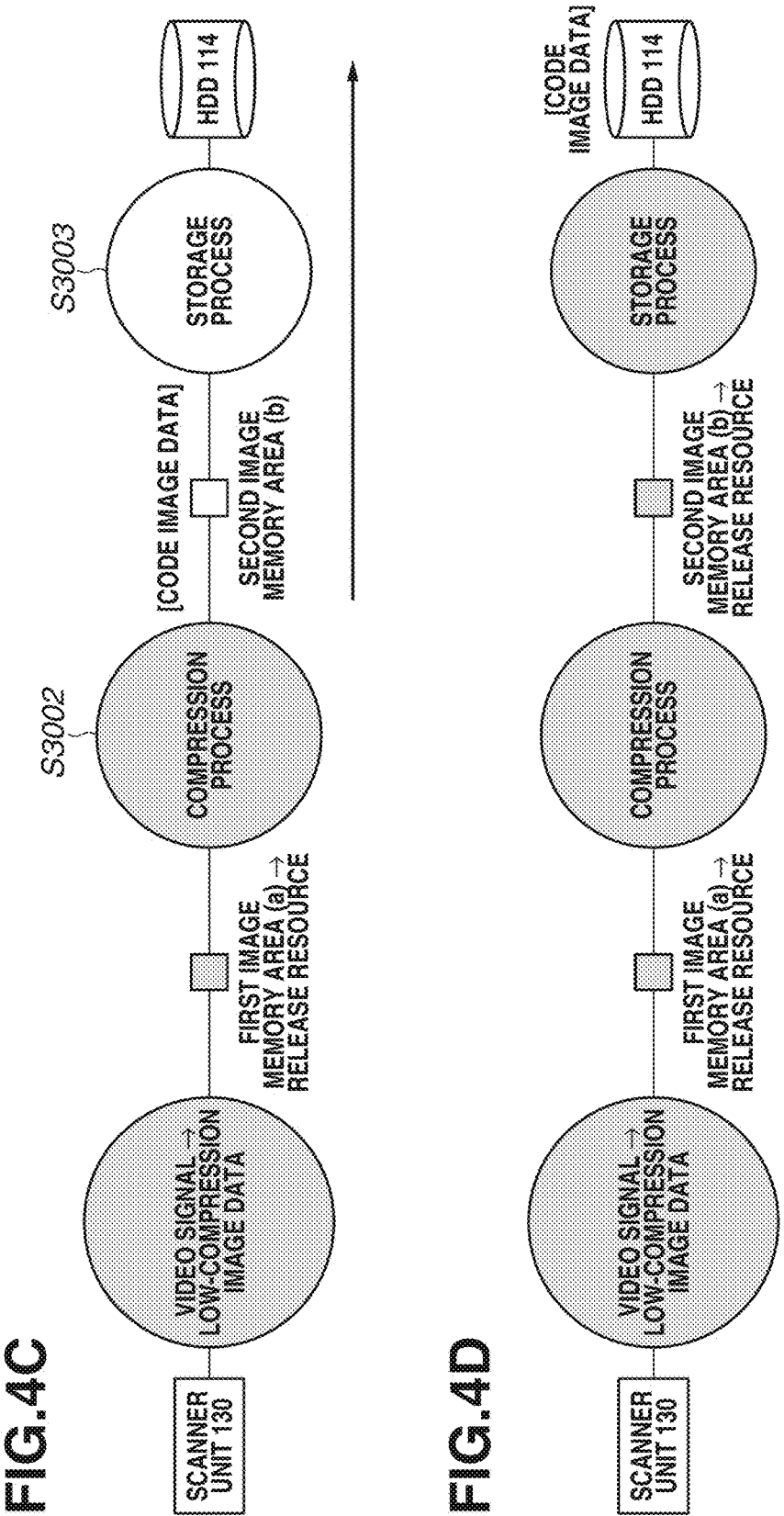

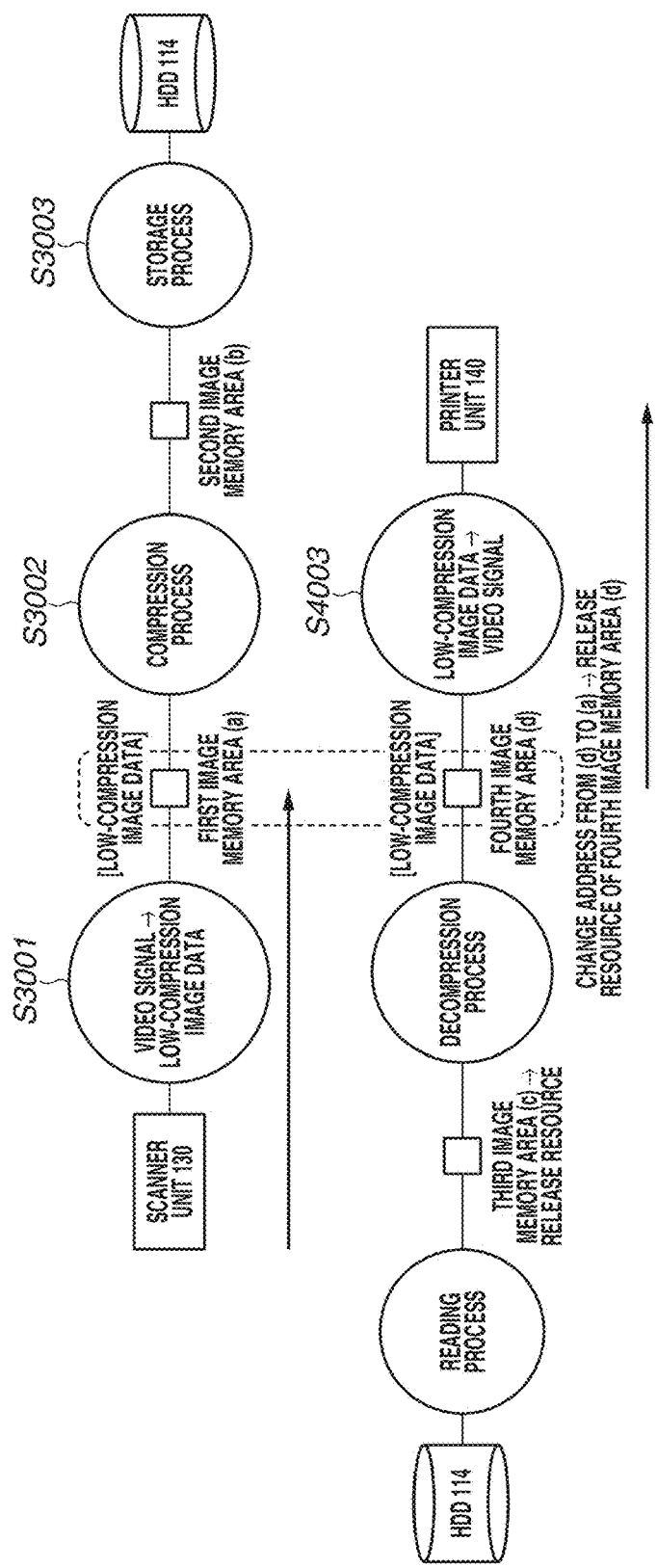

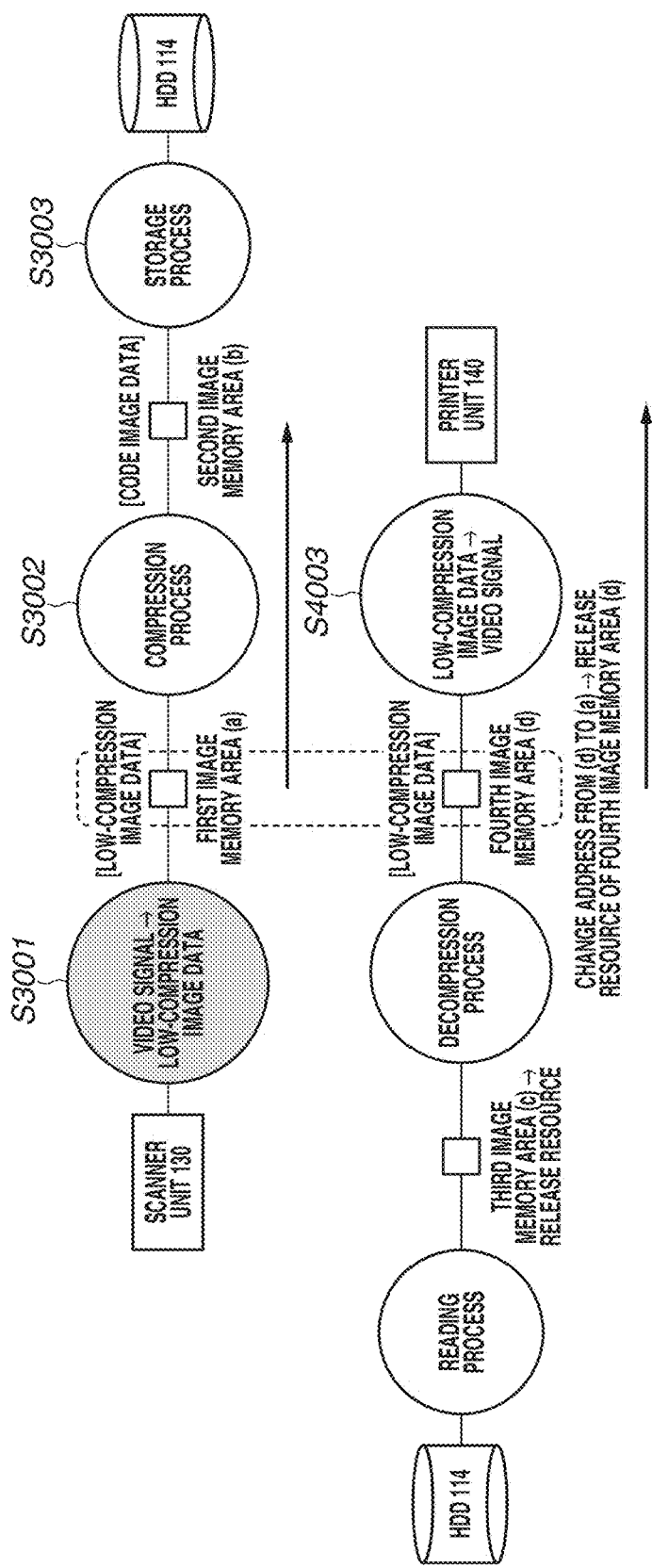

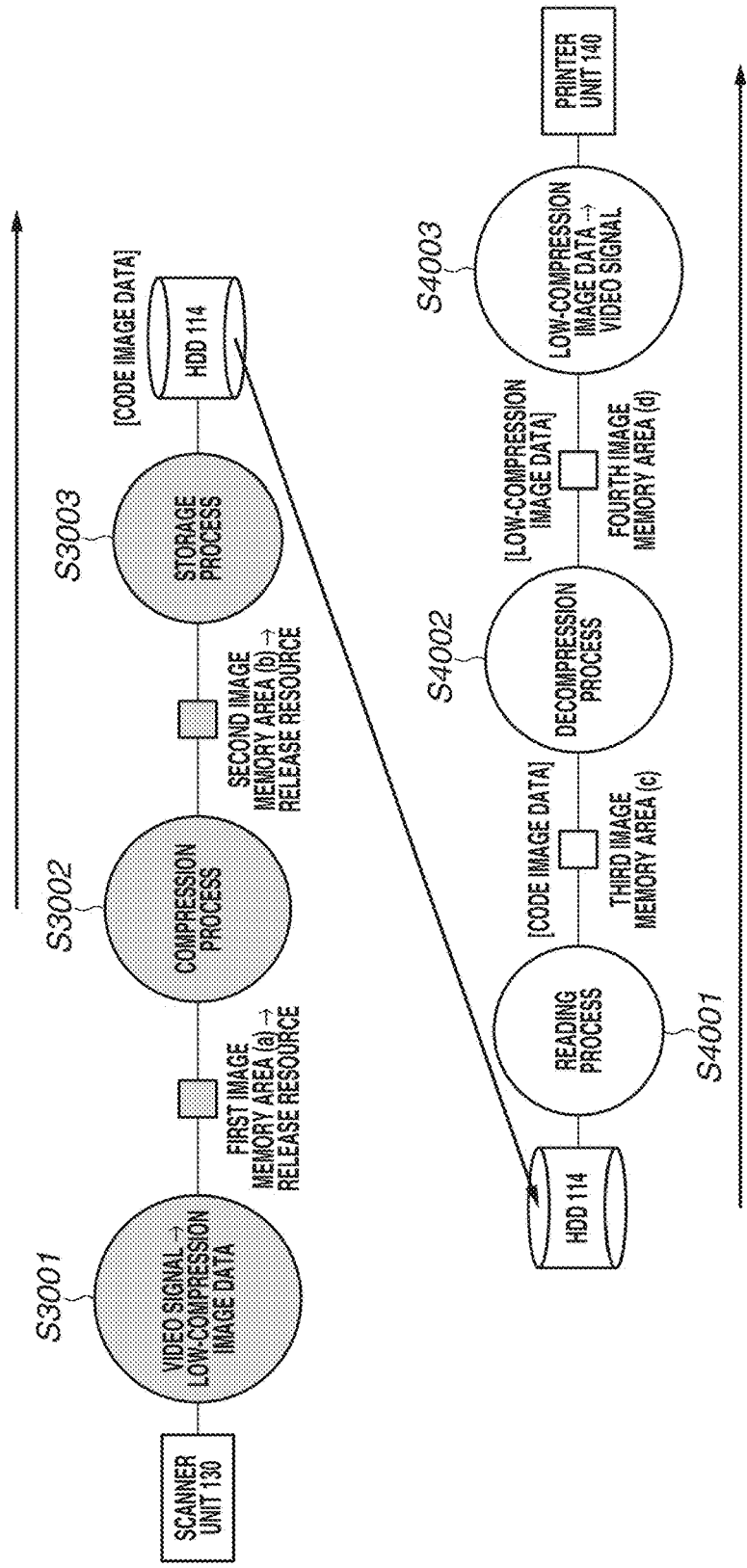

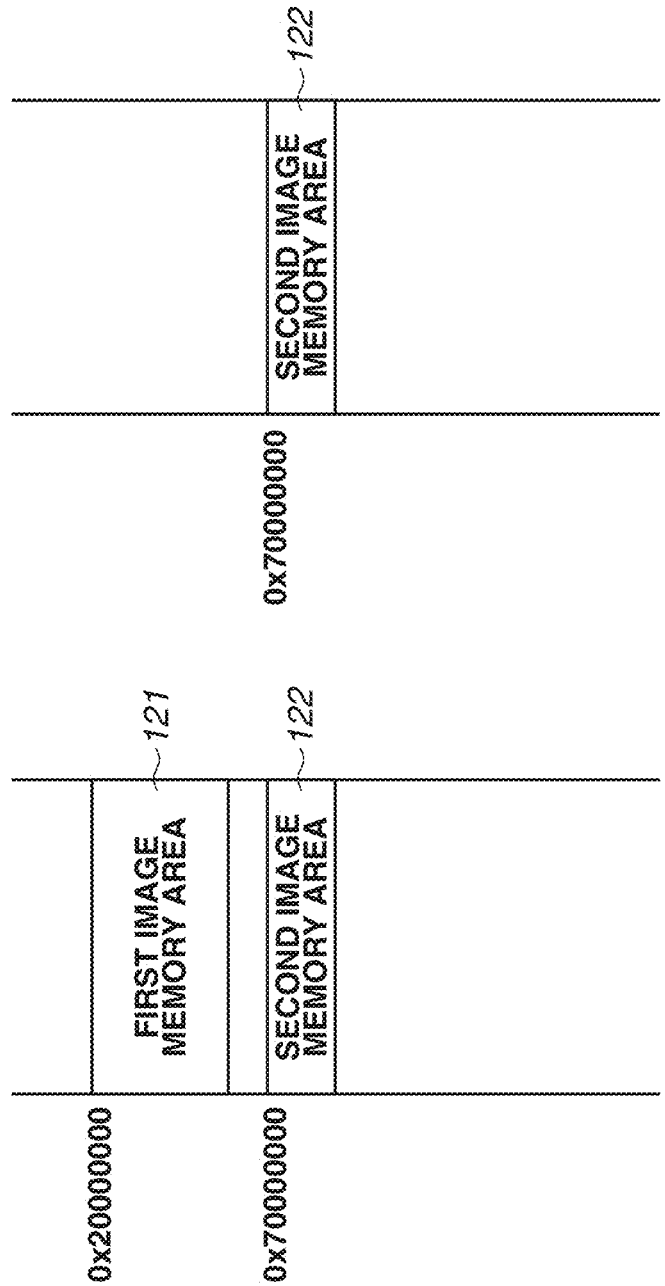

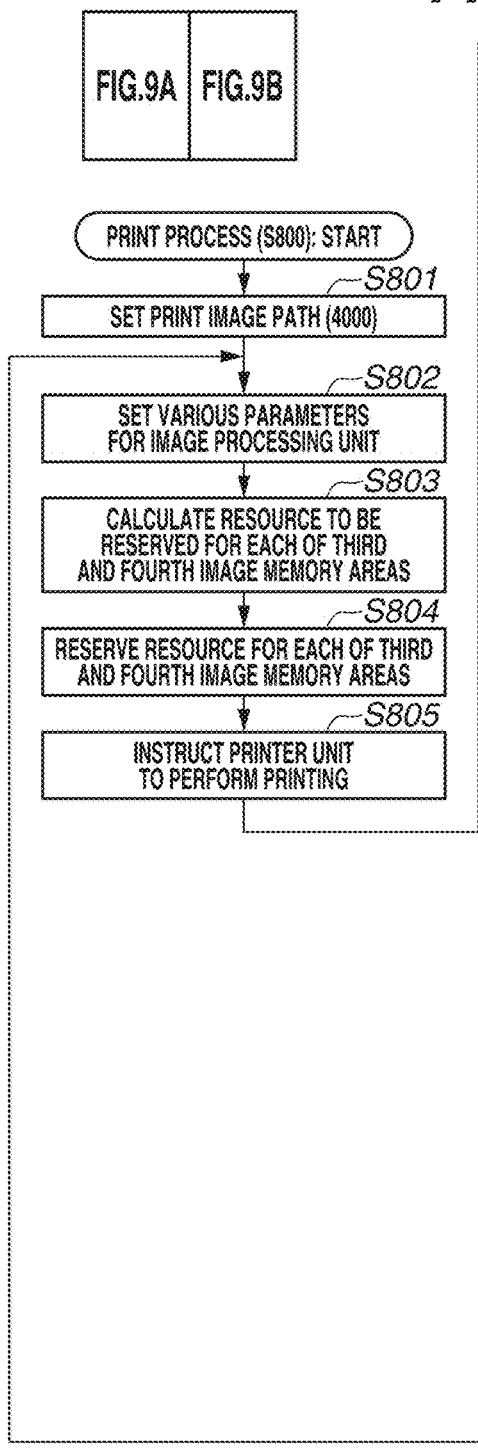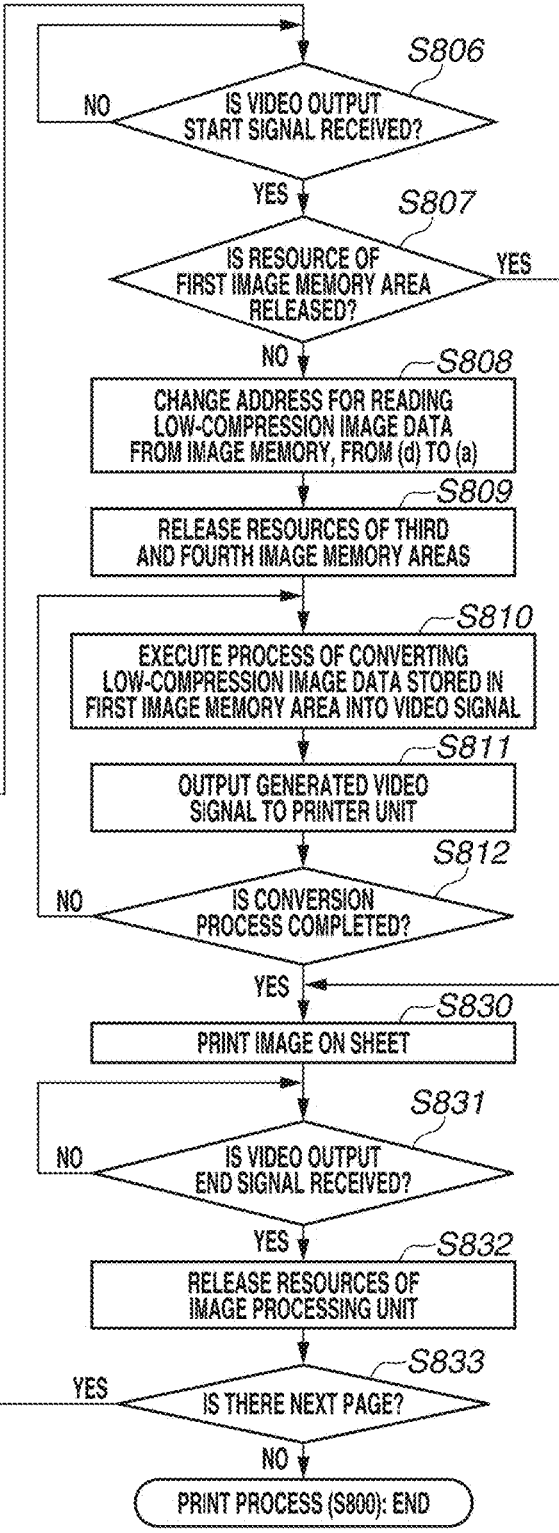

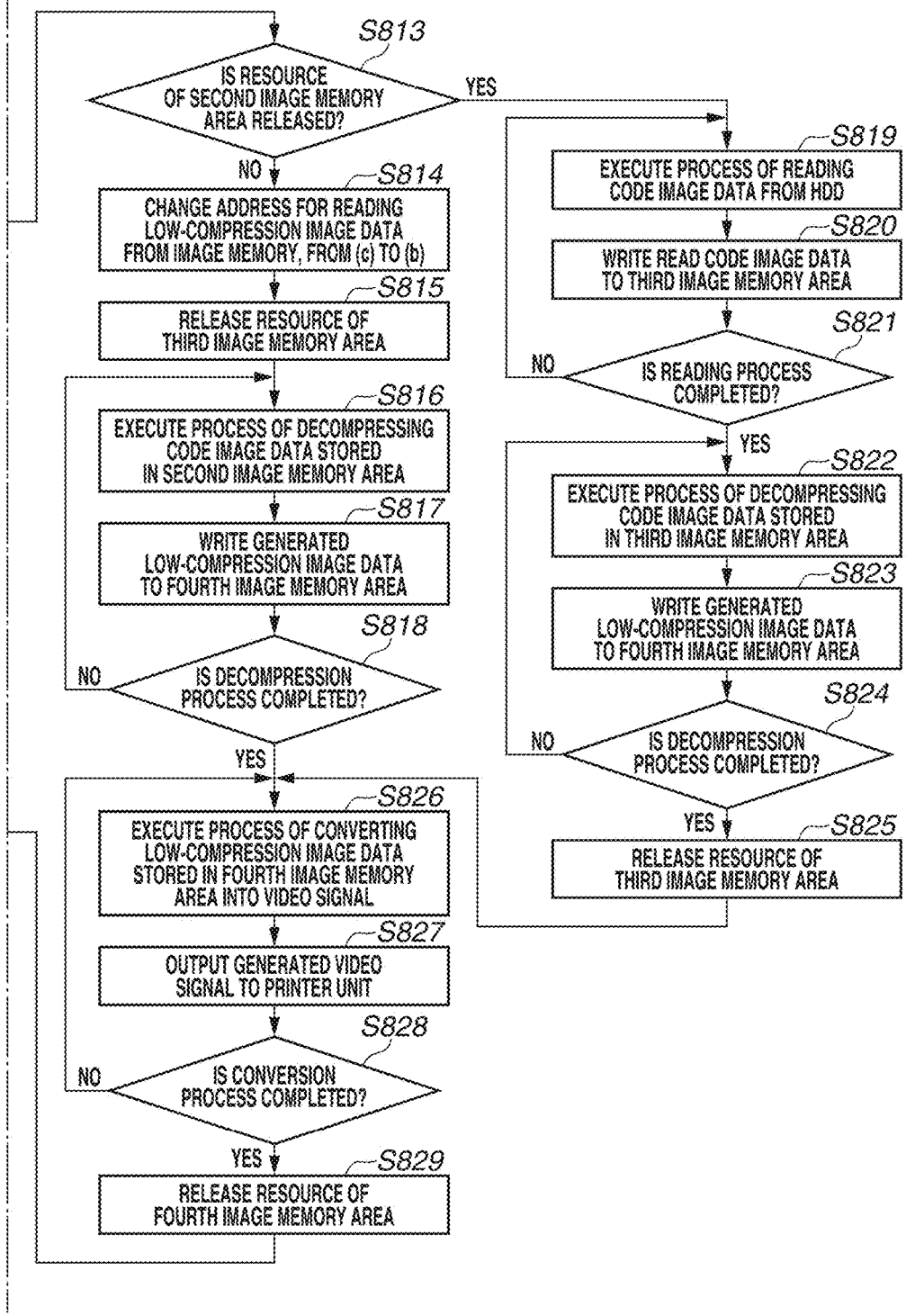

FIG.10A

| Address | Area |
|---|---|
| 0x20000000 | FIRST IMAGE MEMORY AREA (121) |
| 0x70000000 | SECOND IMAGE MEMORY AREA (122) |
| 0x80000000 | THIRD IMAGE MEMORY AREA (123) |
| 0x90000000 | FOURTH IMAGE MEMORY AREA (124) |

FIG.10B

| Address | Area |
|---|---|
| 0x20000000 | FIRST IMAGE MEMORY AREA → FOURTH IMAGE MEMORY AREA (121) |
| 0x70000000 | SECOND IMAGE MEMORY AREA (122) |
| 0x80000000 | THIRD IMAGE MEMORY AREA (123) |
| 0x90000000 | FOURTH IMAGE MEMORY AREA (124) |

FIG.10C

| Address | Area |
|---|---|
| 0x20000000 | FIRST IMAGE MEMORY AREA → FOURTH IMAGE MEMORY AREA (121) |
| 0x70000000 | SECOND IMAGE MEMORY AREA (122) |

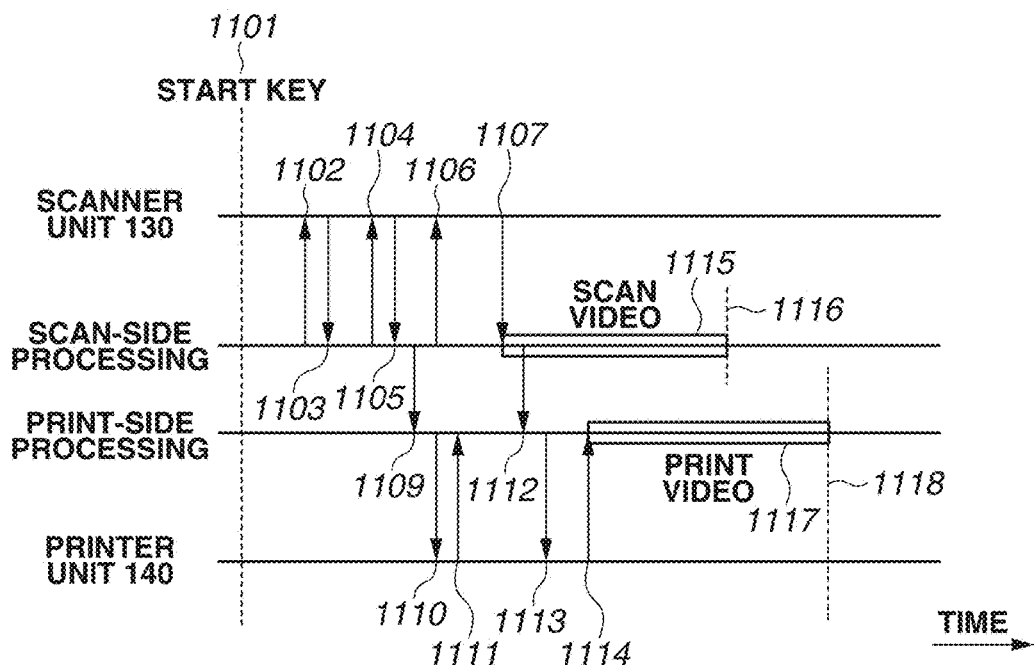
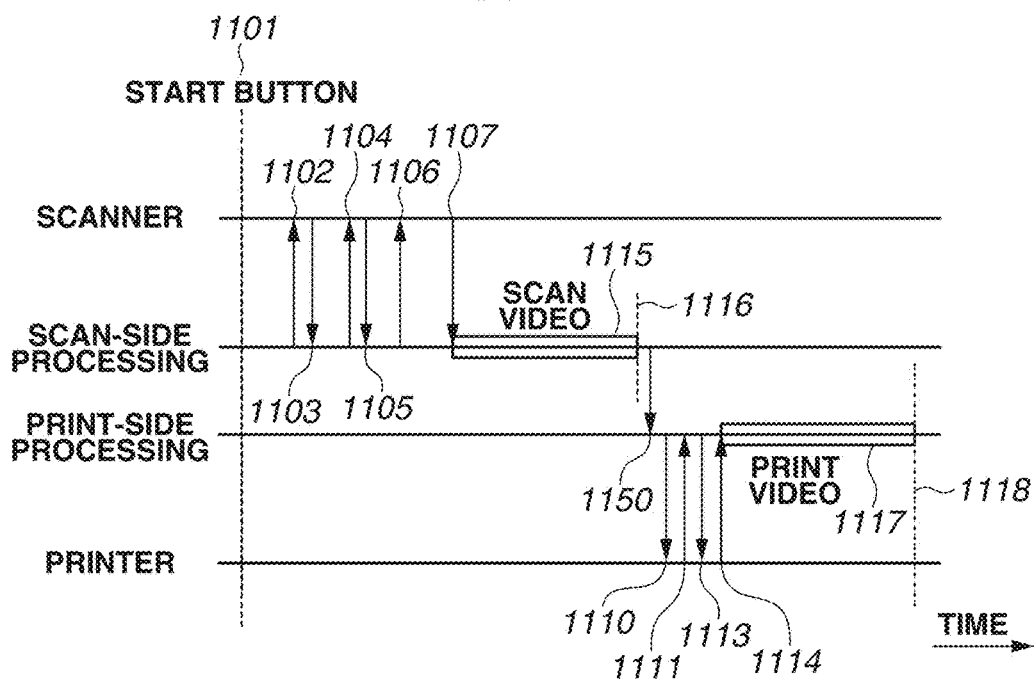

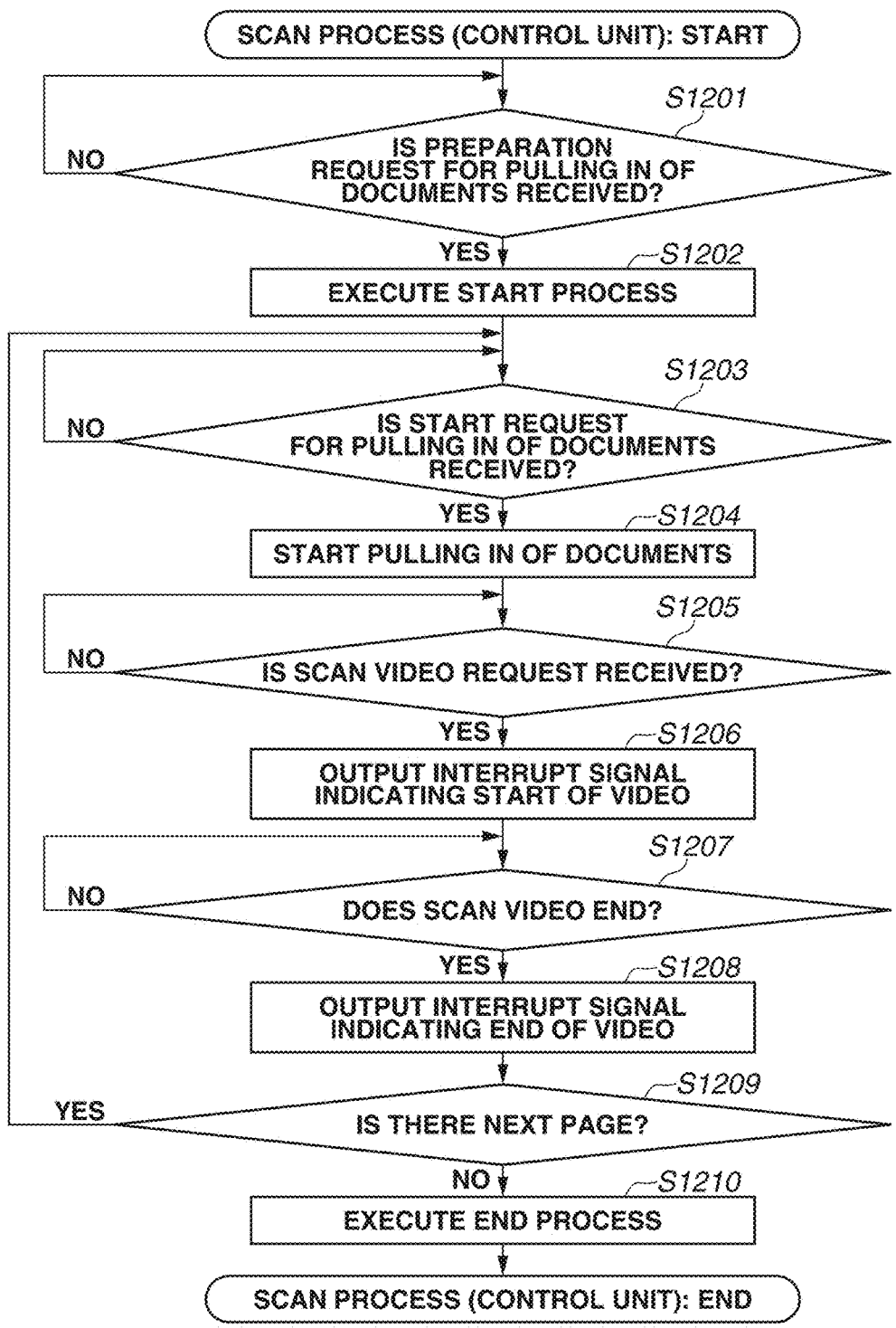

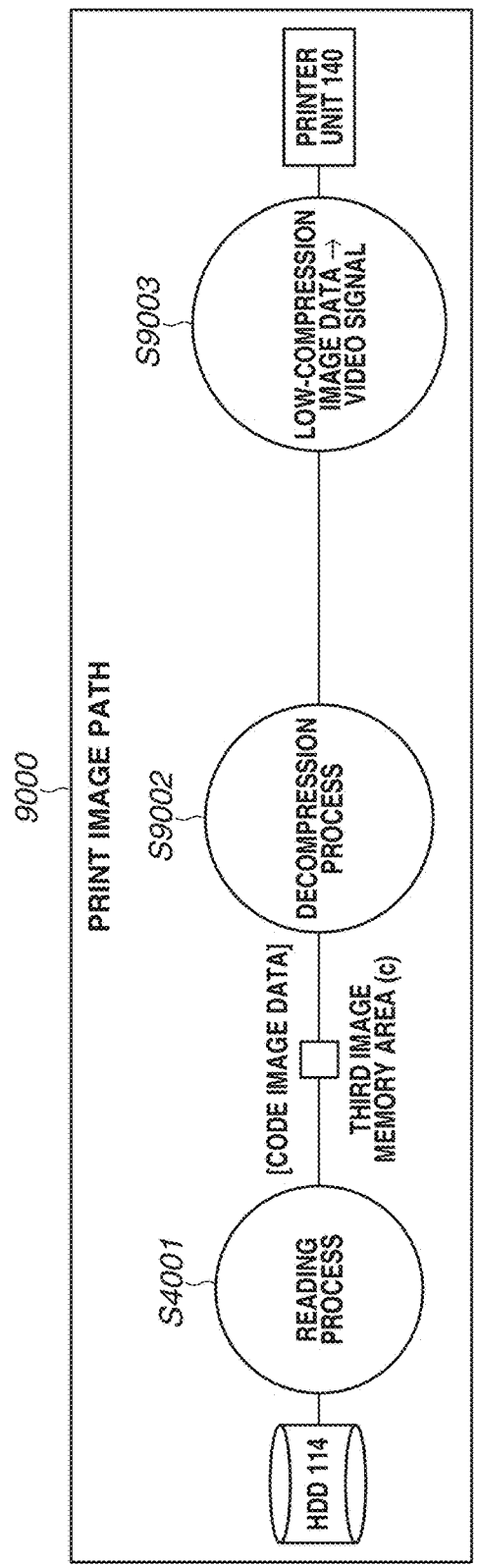

IMAGE FORMING APPARATUS FOR PRINTING IMAGE DATA GENERATED BY READING DOCUMENT, METHOD FOR CONTROLLING THE SAME, AND STORAGE MEDIUM STORING COMPUTER PROGRAM FOR EXECUTING THE METHOD

BACKGROUND OF THE INVENTION

Field of the Invention

The present invention relates to a printing apparatus for printing an image on a sheet, a method for controlling a printing apparatus, and a storage medium.

Description of the Related Art

A method for reading a document includes two methods, namely an optical system movement method and a skimming-through method. In the optical system movement method, a document is placed on platen glass (a document platen), and the document in the fixed position is read while an optical system is moved. There is known a technique for, in a case where a document is read by the optical system movement method, shortening time until image data generated by reading a document of a first page is output to a sheet (referred to as "first copy out time (FCOT)"). On the other hand, in the skimming-through method, a document is placed on a document tray, and the document is read at the position of a fixed optical system while the document is conveyed by an automatic document feeder (ADF).

A multifunction peripheral discussed in the publication of Japanese Patent Application Laid-Open No. 2015-5950 writes image data generated by reading the document to an image memory without compressing the image data when a first page of a document is conveyed by an ADF. Then, before the writing of the image data for a single page to the image memory is finished, the multifunction peripheral starts the reading of the image data for a single page from the image memory and performs printing based on the image data read from the image memory. On the other hand, when a second page or later of a document conveyed by the ADF is conveyed, the multifunction peripheral compresses image data generated by reading the document and writes code data to the image memory. Then, the multifunction peripheral saves in a hard disk drive (HDD) the code data written to the image memory, then reads the code data saved in the HDD, decompresses the code data, and performs printing based on the decompressed image data.

When the copying of a document is executed, if image data generated by reading the document is stored in a first storage unit such as an image memory, then, image data read from the first storage unit is stored in a second storage unit such as an HDD, it takes time to perform the processing. Thus, in the copying of the document, it is more desirable to execute printing based on the image data of the document stored in the first storage unit than to execute printing based on the image data of the document stored in the second storage unit, in terms of the shortening of the processing time.

Meanwhile, when the copying of a plurality of pages is executed, if all image data of documents of the plurality of pages is stored in a first storage unit such as an image memory, and an attempt is made to execute the printing based on image data of documents stored in the first storage unit, an overflow occurs in the first storage unit. This is because the speed of writing image data to the first storage unit through reading from documents is faster than the speed of reading image data from the first storage unit to carry out the printing.

SUMMARY OF THE INVENTION

According to an aspect of the present invention, a printing apparatus includes a reading unit configured to read a document, a first storage unit configured to store image data of the document read by the reading unit, a printing unit configured to execute printing based on the image data read from the first storage unit, a second storage unit configured to store image data read from the first storage unit, and a control unit configured to perform control such that in place of the image data that is stored in the first storage unit and is not subjected to printing by the printing unit, image data of a document newly read by the reading unit is stored, wherein in a case where print target image data can be read from the first storage unit, the printing unit executes printing based on the print target image data that is read from the first storage unit, and in a case where the print target image data cannot be read from the first storage unit, the printing unit executes printing based on image data that corresponds to the print target image data and is read from the second storage unit.

Further features of the present invention will become apparent from the following description of exemplary embodiments with reference to the attached drawings.

BRIEF DESCRIPTION OF THE DRAWINGS

FIGS. 3A and 3B are schematic diagrams illustrating an example of control according to a first exemplary embodiment.

FIGS. 4A to 4D are schematic diagrams illustrating the example of control according to the first exemplary embodiment.

FIGS. 5A to 5D are schematic diagrams illustrating the example of control according to the first exemplary embodiment.

FIGS. 8A and 8B are schematic diagrams illustrating memory control according to the first exemplary embodiment.

FIG. 9 (including FIGS. 9A and 9B) is a flowchart illustrating the example of control according to the first exemplary embodiment.

FIGS. 10A to 10C are schematic diagrams illustrating memory control according to the first exemplary embodiment.

FIGS. 11A and 11B are schematic diagrams illustrating the example of control according to the first exemplary embodiment.

FIG. 12 is a schematic diagram illustrating the example of control according to the first exemplary embodiment.

FIG. 13 is a schematic diagram illustrating an example of control according to a second exemplary embodiment.

DESCRIPTION OF THE EMBODIMENTS

Exemplary embodiments of the present invention will be described in detail below with reference to the accompanying drawings. The following exemplary embodiments do not limit the present invention according to the appended claims, and not all the combinations of the features described in the exemplary embodiments are essential for a method for solving the problems in the present invention.

In a first exemplary embodiment, a printing apparatus stores, in a first storage unit, image data generated by reading a plurality of documents. Next, the printing apparatus stores, in a second storage unit, image data read from the first storage unit. Then, the printing apparatus executes printing based on the image data stored in either one of the first and second storage units.

Until the printing based on image data of documents stored in the first storage unit cannot be executed, the printing apparatus executes printing based on the image data of the documents stored in the first storage unit. If, on the other hand, the printing based on the image data of the documents stored in the first storage unit cannot be executed, the printing apparatus executes the printing based on image data of documents stored in the second storage unit. Under such control, when the copying of documents having a plurality of pages is executed, the processing time for reading the documents having the plurality of pages and executing the printing based on image data generated by reading the documents having the plurality of pages is shortened without causing an overflow in the first storage unit.

The details are described below.

Figure 1:
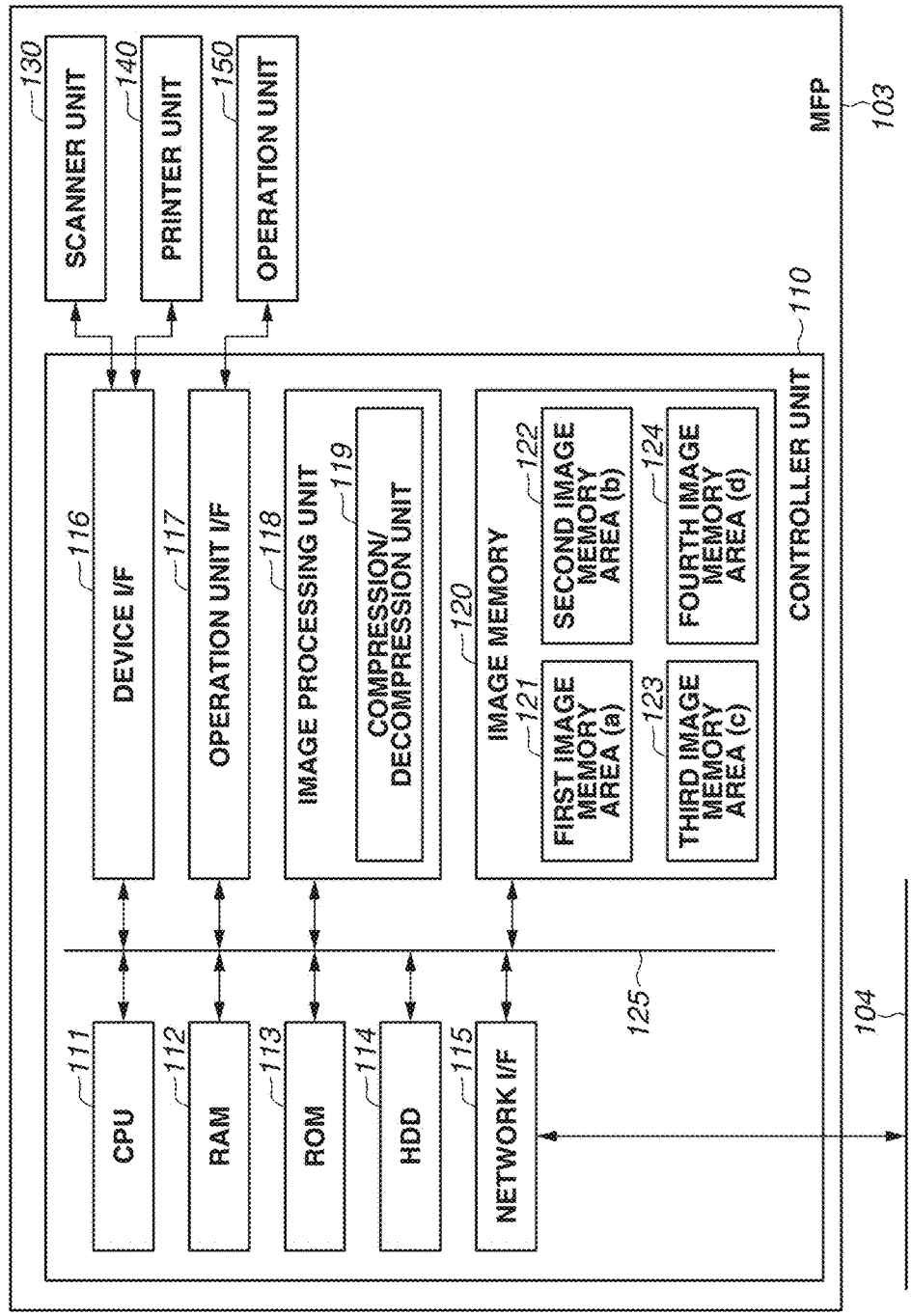
FIG. 1 is a block diagram illustrating a configuration of a multifunction peripheral (MFP) according to the present exemplary embodiment.

With reference to a block diagram in FIG. 1, a description is given of the configuration of a multifunction peripheral (MFP) 103, which is an example of a printing apparatus according to a first exemplary embodiment of the present invention.

The MFP 103 has an image reading function of reading a document to generate image data, and a print function (a copy function) of printing an image on a sheet based on the generated image data. The MFP 103 also has a print function (a PC print function) of receiving a print job from an external apparatus such as a personal computer (PC) and printing a character and an image on a sheet based on data for which a print instruction is given. The printing performed by each print function may be either color printing or monochrome printing.

A controller unit 110 of the MFP 103 is connected to a scanner unit 130, which is an image input device, and a printer unit 140, which is an image output device. The controller unit 110 controls the input and output of image information.

The scanner unit 130 scans an image of a document using an optical sensor, thereby acquiring scan image data. The scanner unit 130 includes a control unit and a scanner device. The control unit includes a central processing unit (CPU), a random-access memory (RAM), a read-only memory (ROM), and a device interface (I/F). The details of the scanner unit 130 will be described below with reference to FIG. 2.

The printer unit 140 prints an image on a sheet based on image data input from the scanner unit 130 or a PC. The details of the printer unit 140 will be described below with reference to FIG. 3.

The controller unit 110 is connected to an operation unit 150, which is an example of a user interface unit. The operation unit 150 includes a display unit and a key input unit. The operation unit 150 has the function of providing information for a user through the display unit. Further, the display unit includes a liquid crystal display (LCD: a liquid crystal display unit) and a touch panel sheet having a transparent electrode attached to the LCD (or a capacitance method may be used). The operation unit 150 has the function of receiving various settings from the user through the touch panel sheet. On the LCD, an operation screen and the state of the MFP 103 are displayed. The key input unit includes, for example, a start key, which is used to give an instruction to start the execution of scanning or copying, and a stop key, which is used to give an instruction to stop the operation of scanning or copying.

The controller unit 110 is connected to an external apparatus (an information processing apparatus) such as a PC or a file sharing server via a network 104 and performs the process of receiving a print job from the external apparatus. The network 104 may be a local area network (LAN) or a wide area network (WAN) such as the Internet.

The controller unit 110 includes a CPU 111, a RAM 112, a ROM 113, an HDD 114, a network I/F 115, a device I/F 116, an operation unit I/F 117, an image processing unit 118, and an image memory 120. These modules are connected to each other via a system bus 125.

The CPU 111 is a processor for controlling the entire MFP 103. Based on a control program stored in the ROM 113, the CPU 111 performs overall control of access to various devices connected to the MFP 103.

The network I/F 115 is an interface for controlling communication with an external network. The network I/F 115 connects the MFP 103 to the network 104 and controls communication for transmitting image data input from the scanner unit 130 to an external apparatus such as a PC or a file sharing server.

The HDD 114 is a storage unit mainly for storing information (system software) necessary to cause a computer to start and operate, and image data. Further, the HDD 114 stores setting information of a job (e.g., setting information of a copy job) received from the user through the operation unit 150.

The RAM 112 is a readable and writable memory. The RAM 112 is also a system work memory for the operation of the CPU 111. The RAM 112 stores image data input from the scanner unit 130 or a PC, various programs, and setting information.

The ROM 113 is a read-only memory. The ROM 113 is also a boot ROM. The ROM 113 stores a boot program for the system in advance.

The ROM 113 or the HDD 114 stores various control programs to be executed by the CPU 111 and necessary to perform various types of processing of flowcharts described below. Further, the ROM 113 or the HDD 114 stores a program for executing rasterization.

The ROM 113 or the HDD 114 also stores a display control program for displaying various user interface screens (hereinafter, "UI screens") on the display unit of the operation unit 150.

The CPU 111 reads a program stored in the ROM 113 or the HDD 111 and loads the read program into the RAM 112 to perform various operations according to the present exemplary embodiment.

The device I/F 116 connects the scanner unit 130 and the printer unit 140 to the controller unit 110 and performs synchronous/asynchronous conversion of image data.

The operation unit I/F 117 is an interface for connecting the operation unit 150 and the controller unit 110 and outputs, to the operation unit 150, image data to be displayed on the operation unit 150. Further, the operation unit I/F 117 transmits, to the CPU 111, information input by the user through the operation unit 150.

The image processing unit 118 performs image processing on image data included in print data received via the network 104 and also performs image processing on image data input or output via the device I/F 116.

The image processing unit 118 stores, in the image memory 120, image data included in print data received via the network 104 or image data generated by the scanner unit 130 which reads a document. Then, according to the value of a register (e.g., a color mode, a magnification, a reading resolution, an output resolution, or an angle of rotation) in an image processing circuit, the image processing unit 118 executes an image conversion process on the image data stored in the image memory 120. The image conversion process refers to, for example, a rotation process, a resolution conversion process, or a magnification process. Then, the image processing unit 118 stores the converted image data in the image memory 120 again.

A compression/decompression unit 119 performs, using various compression methods such as Joint Bi-level Image Experts Group (JBIG) and Joint Photographic Experts Group (JPEG), the process of compressing or decompressing image data stored in the image memory 120 and the process of decompressing image data stored in the HDD 114. Further, the compression/decompression unit 119 includes an image processing block for storing the compressed image data or the decompressed image data in the image memory 120 or the HDD 114 again.

The image memory 120 is a memory (a storage unit) for temporarily loading image data to be processed by the image processing unit 118 and writing the loaded image data. The image memory 120 includes, for example, areas (a first image memory area 121 and a fourth image memory area 124) for storing low-compression image data, and areas (a second image memory area 122 and a third image memory area 123) for storing code image data.

An address for storing image data in the image memory 120 is specified for each page of image data. Then, information indicating the address of the image memory 120 which stores the page number of the image data is saved in the RAM 112.

The first image memory area 121 is an area specified by, for example, an address "0x20000000" (hereinafter also referred to as an "address (a)"). If the size of low-compression image data to be stored in the image memory 120 is 133 MBytes, an area of 133 MBytes is reserved from the address "0x20000000".

The second image memory area 122 is an area specified by, for example, an address "0x70000000" (hereinafter also referred to as an "address (b)"). If the size of code image data to be stored in the image memory 120 is 25 MBytes, an area of 25 MBytes is reserved from the address "0x70000000".

The third image memory area 123 is an area specified by, for example, an address "0x80000000" (hereinafter also referred to as an "address (c)"). If the size of code image data to be stored in the image memory 120 is 25 MBytes, an area of 25 MBytes is reserved from the address "0x80000000".

The fourth image memory area 124 is an area specified by, for example, an address "0x90000000" (hereinafter also referred to as an "address (d)"). If the size of low-compression image data to be stored in the image memory 120 is 133 MBytes, an area of 133 MBytes is reserved from the address "0x90000000".

The size of an area to be reserved in the image memory 120 for the first image memory area 121 and the fourth image memory area 124 is the same, and the size of an area to be reserved in the image memory 120 for the second image memory area 122 and the third image memory area 123 is the same.

The sizes to be reserved as the first image memory area 121, the second image memory area 122, the third image memory area 123, and the fourth image memory area 124 may vary according to the compression ratio or the size of image data.

Further, the start of an address for storing image data in the image memory 120 may be assigned without intervals between the first image memory area 121, the second image memory area 122, the third image memory area 123, and the fourth image memory area 124.

Figure 2:
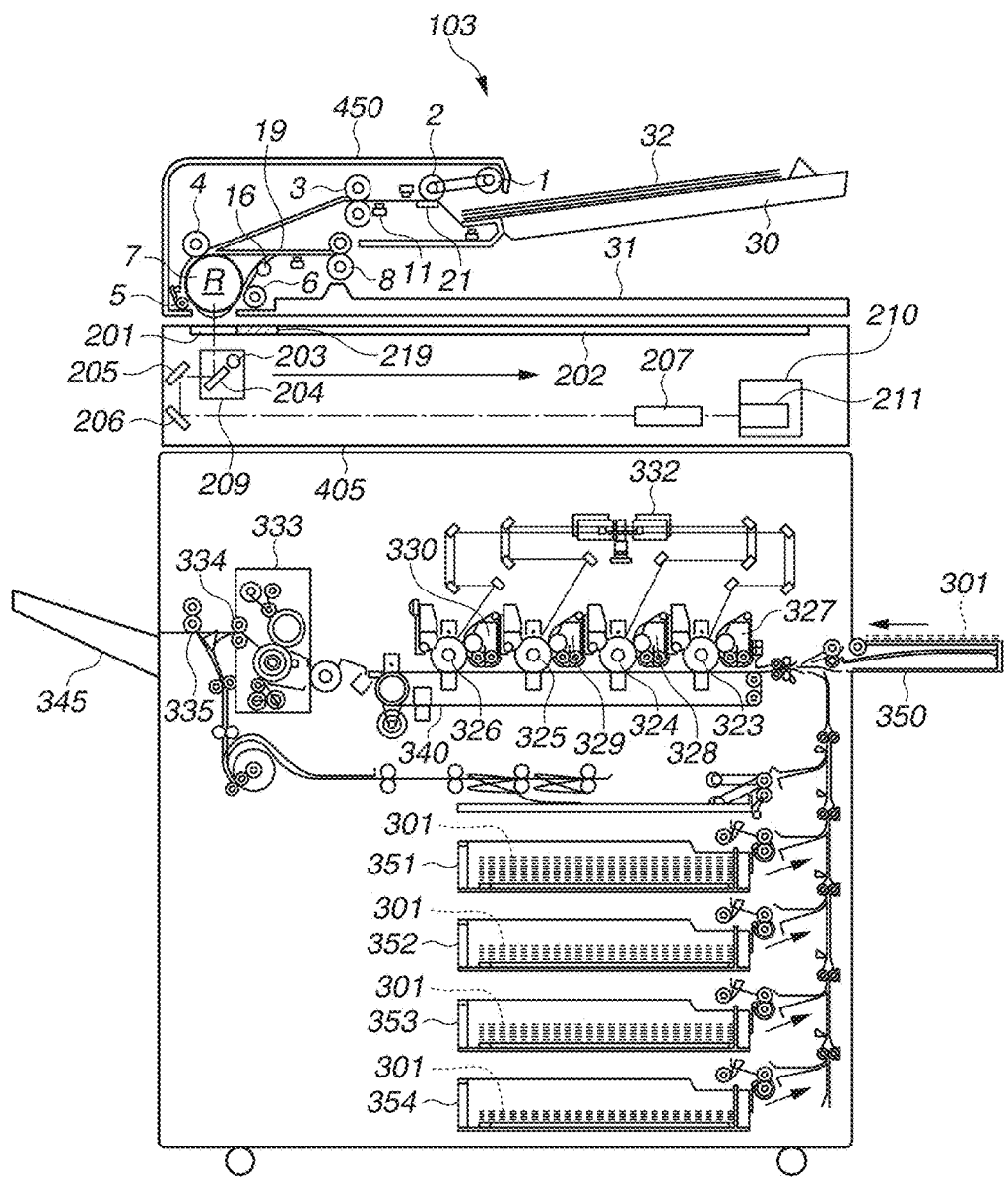
FIG. 2 is a cross-sectional view illustrating the configuration of the MFP according to the present exemplary embodiment.

Next, with reference to a cross-sectional view in FIG. 2, the configuration of the MFP 103 is described. The MFP 103 includes the scanner unit 130 and the printer unit 140.

First, with reference to the cross-sectional view in FIG. 2, the operation of the scanner unit 130 is described.

The scanner unit 130 includes an automatic document feeding unit 450. The automatic document feeding unit 450 includes a document tray 30 for stacking documents and feeds each of the documents 32 placed on the document tray 30. Then, the scanner unit 130 reads an image of the fed document 32 at the position of a fixed optical system. This operation is specifically described below.

The automatic document feeding unit 450 includes a feed roller 1, the document tray 30, in which a bundle of documents including one or more documents 32 is stacked, and a separation pad 21, which prevents the bundle of documents from protruding from the document tray 30 to advance downstream before the conveyance of the documents 32 is started.

The feed roller 1 falls on the document surface of the bundle of documents stacked in the document tray 30 and rotates. Consequently, the document 32 on the top surface of the bundle of documents is fed. The plurality of documents 32 fed by the feed roller 1 is separated and fed one by one by the actions of a separation roller 2 and the separation pad 21. This separation is achieved by a known retard separation technique.

Each of the documents 32 separated by the separation roller 2 and the separation pad 21 is conveyed to a registration roller 4 by a pair of conveying rollers 3. Then, the conveyed document 32 hits against the registration roller 4. Consequently, the document 32 is formed into a loop to remove the skew of the conveyance of the document 32. A feeding path is placed downstream of the registration roller 4. The feeding path conveys the document 32 having passed through the registration roller 4, in the direction of skimming-through glass 201.

The document 32 sent to the feeding path is sent onto a platen by a large roller 7 and a feed roller 5. At this time, the large roller 7 comes into contact with the skimming-through glass 201. The document 32 fed by the large roller 7 passes through a conveying roller 6 and moves between a roller 16 and a discharge flapper. Then, the document 32 is discharged to a document discharge tray 31 through the discharge flapper and discharge rollers 8.

The scanner unit 130 can read an image of the back surface of the document 32 by reversing the document 32. Specifically, in the state where the document 32 is inserted between the discharge rollers 8, the discharge rollers 8 are rotated backward and the discharge flapper is switched over to move the document 32 to a reverse path 19. The moved document 32 hits against the registration roller 4 from the reverse path 19, and the document 32 is formed into a loop again, to remove the skew of the conveyance of the document 32. Then, the document 32 is moved to the skimming-through glass 201 again by the feed roller 5 and the large roller 7. This enables the scanner unit 130 to read an image of the back surface of the document 32 passing through the skimming-through glass 201.

The scanner unit 130 optically reads image information recorded on a document placed on document platen glass 202, by an optical scanner unit 209 which scans the document in a sub-scanning direction indicated by an arrow in FIG. 2. On the other hand, the scanner unit 130 conveys the documents 32 on the document tray 30 one by one to a center of a reading position by the automatic document feeding unit 450. Then, the scanner unit 130 moves the optical scanner unit 209 to the center of the reading position of the large roller 7 in the automatic document feeding unit 450 and reads the document 32 at the center of the reading position of the large roller 7.

Then, the document 32 on the document tray 30 or the document on the document platen glass 202 is read by a following optical system. This optical system includes the skimming-through glass 201, the document platen glass 202, the optical scanner unit 209, which includes an optical lamp 203 and a mirror 204, mirrors 205 and 206, a lens 207, and a charge-coupled device (CCD) sensor unit 210. In the present exemplary embodiment, the CCD sensor unit 210 includes a CCD 211 (a CCD (3-line sensor unit) for reading a color image (red, green, and blue (RGB) and a CCD (1-line sensor unit) for reading a monochrome image).

The image information read by the optical system is photoelectrically converted and input as image data to the controller unit 110 described with reference to FIG. 1. In the present exemplary embodiment, the optical system included in the scanner unit 130 is a reduction optical system, which forms an image of reflected light from the document 32 on a CCD sensor. The present invention, however, is not limited to this embodiment. Alternatively, the optical system included in the scanner unit 130 may be an equal-magnification optical system, which forms an image of reflected light from the document 32 on a contact image sensor (CIS).

Next, with reference to the cross-sectional view in FIG. 2, the operation of the printer unit 140 is described. The printer unit 140 performs the operation of outputting an image onto a sheet 301 based on image data transferred to the printer unit 140 (a printing operation). This operation is specifically described below.

Image data transferred to the printer unit 140 is converted into laser light according to the image data by a laser unit 332. Then, photosensitive drums (323 to 326) are irradiated with the laser light, thereby forming electrostatic latent images on the photosensitive drums (323 to 326) according to the image data. To the portions of the latent images on the photosensitive drums (323 to 326), toner (a developer) is attached by developing units (327 to 330). A color printer includes four photosensitive drums (323 to 326) and four developing units (327 to 330) for cyan, yellow, magenta, and black.

Further, the printer unit 140 includes cassettes (351 to 354) and a manual-feeding tray 350 as a sheet holding unit (also referred to as a "sheet feeding stage").

The cassettes (351 to 354) have drawable shapes and can hold a plurality of (e.g., 600) sheets 301. On the other hand, the manual-feeding tray 350 has an insertable shape and can hold a plurality of (e.g., 100) sheets 301.

The printer unit 140 transfers the toner attached to the photosensitive drums (323 to 326) onto a sheet 301 fed from any one of the cassettes (351 to 354) and the manual-feeding tray 350. Then, the printer unit 140 conveys to a fixing unit 333 the sheet 301 onto which the toner is transferred. Then, the printer unit 140 fixes the toner onto the sheet 301 by heat and pressure. The sheet 301 having passed through the fixing unit 333 is discharged to a discharge tray 345 (a discharge unit) provided in the MFP 103 by conveying rollers 334 and 335.

According to the present embodiment, the MFP 103 is a color printer including four photosensitive drums (323 to 326) and four developing units (327 to 330). The present invention, however, is not limited to this embodiment. Alternatively, the present invention can also be similarly applied to the MFP 103 that is a monochrome printer including a single photosensitive drum 326 and a single developing unit 330.

A description has been given of a method for printing an image on the sheet 301 by an electrophotographic method. The present invention, however, is not limited to this embodiment. Alternatively, the present invention can also be similarly applied to an ink-jet method or another method (e.g., a thermal transfer method) so long as the method can print an image on the sheet 301.

In the first exemplary embodiment, a printing apparatus stores image data generated by reading a plurality of documents in a first storage unit (e.g., the image memory 120). Next, the printing apparatus stores image data read from the first storage unit, in a second storage unit (e.g., the HDD 114). Then, the printing apparatus executes printing based on the image data stored in either one of the first and second storage units.

Until printing based on image data of documents stored in the first storage unit cannot be executed, the printing apparatus executes printing based on the image data of the documents stored in the first storage unit. If, on the other hand, printing based on the image data of the documents stored in the first storage unit cannot be executed, the printing apparatus executes printing based on image data of documents stored in the second storage unit. Under such control, when the copying of documents having a plurality of pages is executed, the processing time for reading the documents having the plurality of pages, and executing printing based on image data generated by reading the documents having the plurality of pages is shortened without causing an overflow in the first storage unit.

The details are described below.

With reference to a schematic diagram illustrated in FIG. 3A, a description is given of a series of processes (steps S3001 to S3003) after a video signal is input from the scanner unit 130 until code image data is stored in the HDD 114.

The CPU 111 sets a scan image path 3000 illustrated in FIG. 3A, which defines the order of image processing and the order of image areas for scanning. Then, after setting the scan image path 3000, the CPU 111 executes the processes of steps S3001 to S3003. Further, the CPU 111 sets various parameters for the image processing unit 118 to perform image processing described below in steps S3001 to S3003.

Step S3001 is the process of converting a video signal input from the scanner unit 130 into low-compression image data. The low-compression image data converted in step S3001 is stored in the first image memory area 121, which is referenced by the address (a) in the image memory 120.

Step S3002 is a compression process in which the compression/decompression unit 119 compresses the low-compression image data stored in the first image memory area 121, thereby generating code image data. The low-compression image data refers to image data of which the compression ratio is low. The low-compression image data may be image data that is not compressed (non-compressed image data). On the other hand, the code image data refers to image data of which the compression ratio is higher than that of the low-compression image data. That is, the amount of data of the low-compression image data is larger than that of the code image data. The code image data generated in step S3002 is stored in the second image memory area 122, which is referenced by the address (b) in the image memory 120.

Step S3003 is the process of storing in the HDD 114 the code image data stored in the second image memory area 122. As a result of the process of step S3003, without waiting for the completion of the code image data reading of a document at a first page stored in the second image memory area 122, it is possible to store code image data of a document at a second page which follows the first page in the second image memory area 122. Thus, it is possible to prevent delay of reading start of the document at the second page following the first page from being delayed.

At the time that a scan process is started, the CPU 111 reserves a resource for storing data for each of the first image memory area 121, the second image memory area 122, and the HDD 114. For example, suppose that the size of read documents is "A4", and the reading resolution is "600 dpi" (32 bits per pixel). In this case, for the first image memory area 121, the CPU 111 reserves a resource for storing, for example, 133 MBytes of data (low-compression image data). On the other hand, for the second image memory area 122, the CPU 111 reserves a resource for storing, for example, 25 MBytes of data (code image data).

After the compression process described in step S3002 is completed, the CPU 111 releases the resource of the first image memory area 121. Further, after the storage process described in step S3003 is completed, the CPU 111 releases the resource of the second image memory area 122.

When the resource of the first image memory area 121 is released, the low-compression image data stored in the first image memory area 121 is deleted. Further, when the resource of the second image memory area 122 is released, the code image data stored in the second image memory area 122 is deleted. Consequently, an overflow does not occur in the image memory 120.

Next, with reference to a schematic diagram illustrated in FIG. 3B, a description is given of a series of processes (steps S4001 to S4003) after data is read from the image memory 120 or the HDD 114, until a video signal is output to the printer unit 140.

The CPU 111 sets a print image path 4000 illustrated in FIG. 3B, which defines the order of image processing and the order of image areas for printing. Then, after setting the print image path 4000, the CPU 111 executes the processes of steps S4001 to S4003. The CPU 111 sets various parameters for the image processing unit 118 to perform image processing described below in steps S4001 to S4003.

Step S4001 is the process of reading code image data stored in the HDD 114. The code image data read from the HDD 114 in step S4001 is stored in the third image memory area 123, which is referenced by the address (c) in the image memory 120.

Step S4002 is a decompression process in which the compression/decompression unit 119 decompresses the code image data stored in the third image memory area 123, thereby generating low-compression image data. The low-compression image data generated in step S4002 is stored in the fourth image memory area 124, which is referenced by the address (d) in the image memory 120.

Step S4003 is the process of converting the low-compression image data stored in the fourth image memory area 124 into a video signal and outputting the video signal to the printer unit 140.

At the time that a print process is started, the CPU 111 reserves a resource for storing data for each of the third image memory area 123, the fourth image memory area 124, and the HDD 114.

Suppose that at the execution timing of the print process, the resource of the first image memory area 121 which stores low-compression image data of a document of the same page is not released. In this case, as the address for reading low-compression image data from the image memory 120, the CPU 111 replaces the address (d) for referencing the fourth image memory area 124 with the address (a) for referencing the first image memory area 121.

That is, as preprocessing for outputting a video signal to the printer unit 140, the CPU 111 may read the low-compression image data stored in the area specified by the address (a) in the image memory 120. In other words, the CPU 111 acquires the low-compression image data stored in the first image memory area 121 and therefore can omit the processes of steps S4001 and S4002 described with reference to FIG. 3B. Thus, it is possible to shorten the time until the printing of an image on a sheet is started, as compared to the case where all the processes of steps S4001 to S4003 are executed.

Further, if the address for reading low-compression image data from the image memory 120 is replaced, low-compression image data of the document of the same page is not stored in the fourth image memory area 124. The resource of the fourth image memory area 124 once reserved becomes unnecessary. Thus, the CPU 111 releases the resource of the fourth image memory area 124. Further, if the address for reading low-compression image data from the image memory 120 is replaced, code image data of the document of the same page is not stored in the third image memory area 123. The resource of the third image memory area 123 once reserved becomes unnecessary. Thus, the CPU 111 releases the resource of the third image memory area 123. The resources in the image memory 120 that become unnecessary are thus released, whereby the resources in the image memory 120 can be assigned to a scan process of another page.

On the other hand, suppose that at the execution timing of the print process, the resource of the first image memory area 121 which stores low-compression image data of a document of the same page is released, and the resource of the second image memory area 122 which stores code image data of the document at the same page is not released. In this case, as the address for reading code image data from the image memory 120, the CPU 111 replaces the address (c) for referencing the third memory area 123 with the address (b) for referencing the second image memory area 122.

That is, as preprocessing for outputting a video signal to the printer unit 140, the CPU 111 may read the code image data stored in the area specified by the address (b) in the image memory 120. In other words, the CPU 111 acquires the code image data stored in the second image memory area 122 and therefore can omit the process of step S4001 described with reference to FIG. 3B. Thus, it is possible to shorten the time until the printing of an image on a sheet is started, as compared to the case where all the processes of steps S4001 to S4003 are executed.

Further, if the address for reading code image data from the image memory 120 is replaced, code image data is not stored in the third image memory area 123. The resource of the third image memory area 123 once reserved becomes unnecessary. Thus, the CPU 111 releases the resource of the third image memory area 123. The resource in the image memory 120 that becomes unnecessary is thus released, whereby the resource in the image memory 120 can be assigned to perform a scan process on another page.

On the other hand, suppose that at the execution timing of the print process, the resource of the first image memory area 121 in which low-compression image data of a document of the same page is stored is released, and the resource of the second image memory area 122 in which code image data of the document of the same page is stored is released. In this case, the CPU 111 reads code image data from the HDD 114 and performs the processes of steps S4001, S4002, and S4003.

Next, with reference to schematic diagrams in FIGS. 4A to 4D, a description is given of the processing order when the MFP 103 according to the first exemplary embodiment performs a scan process.

FIG. 4A illustrates a phase in which the process of step S3001 is executed, thereby storing low-compression image data in the first image memory area 121.

FIG. 4B illustrates a phase in which, after the low-compression image data is stored in the first image memory area 121, the process of step S3002 is executed, thereby storing code image data in the second image memory area 122.

FIG. 4C illustrates a phase in which, after the code image data is stored in the second image memory area 122, the process of step S3003 is executed, thereby storing the code image data in the HDD 114. At this time, the resource of the first image memory area 121 is released. Thus, the resource of the first image memory area 121 can be assigned to a scan process of another page.

FIG. 4D illustrates a state where the scan process is completed, and the code image data is stored in the HDD 114. At this time, the resources of the first image memory area 121 and the second image memory area 122 are released. Thus, the resources of the first image memory area 121 and the second image memory area 122 can be assigned to a scan process of another page.

Next, with reference to schematic diagrams in FIGS. 5A to 5D, a description is given of the processing order in a case where during the operation of a copy process, the MFP 103 according to the first exemplary embodiment carries out a scan process and a print process in parallel. FIGS. 5A to 5D illustrate a case where the print process is started in any one of the phases described with reference to FIGS. 4A to 4D.

It is assumed that in the MFP 103 according to the first exemplary embodiment, the speed of writing image data to the image memory 120 by reading documents is faster than the speed of reading image data from the image memory 120 for printing.

The following description is given on the assumption that in the operation of the copy process in the first exemplary embodiment, a setting is made so that the address (d) for referencing the fourth image memory area 124 can be replaced with the address (a) for referencing the first image memory area 121.

Further, the following description is given on the assumption that in the operation of the copy process in the first exemplary embodiment, a setting is made so that the address (c) for referencing the third image memory area 123 can be replaced with the address (b) for referencing the second image memory area 122.

FIG. 5A illustrates the processing of the copy operation in a case where the print process is started in the phase of the scan process described with reference to FIG. 4A. In this phase of the copy process operation, the address (d) for referencing the fourth image memory area 124 is replaced with the address (a) for referencing the first image memory area 121. Then, in the process of step S4003, the low-compression image data stored in the first image memory area 121 is read. That is, in the copy process operation in FIG. 5A, the operation of the copy process is performed only in the process of step S3001 described with reference to FIG. 3A and the process of step S4003 described with reference to FIG. 3B.

That is, in the print process in FIG. 5A, the CPU 111 acquires the low-compression image data stored in the first image memory area 121 and therefore can omit the processes of steps S4001 and S4002 described with reference to FIG. 3B. Thus, it is possible to shorten the time until the printing of an image on a sheet is started, as compared to the case where all the processes of steps S4001 to S4003 are executed.

Further, in the scan process in FIG. 5A, to store code image data in the HDD 114, the processes are performed up to steps S3002 and S3003 described with reference to FIG. 3A. The code image data is thus stored in the HDD 114, whereby, even if an abnormality occurs (for example, a print jam occurs) in the print process, it is possible to resume the print process after recovery from the abnormality.

FIG. 5B illustrates the processing of the copy operation in a case where the print process is started in the phase of the scan process described with reference to FIG. 4B. In this phase of the copy operation, the process of step S3001 is completed, and the process of step S3002 is being executed. That is, in this phase, the resource of the first image memory area 121 is being used for the process of step S3002. In other words, in this phase, the resource of the first image memory area 121 has not yet been released. Thus, similarly to the copy process operation in FIG. 5A, in the copy operation in FIG. 5B, the address (d) for referencing the fourth image memory area 124 is replaced with the address (a) for referencing the first image memory area 121. Then, in the process of step S4003, the low-compression image data stored in the first image memory area 121 is read. That is, in the copy operation in FIG. 5B, the operation of the copy process is performed only in the processes of steps S3001 and S4003.

That is, in the print process in FIG. 5B, the CPU 111 acquires the low-compression image data stored in the first image memory area 121 and therefore can omit the processes of steps S4001 and S4002 described with reference to FIG. 3B. Thus, it is possible to shorten the time until the printing of an image on a sheet is started, as compared to the case where all the processes of steps S4001 to S4003 are executed.

Further, in the scan process in FIG. 5B, to store code image data in the HDD 114, the processes are performed up to steps S3002 and S3003. The code image data is thus stored in the HDD 114, whereby, even if an abnormality occurs (for example, a print jam occurs) in the print process, it is possible to resume the print process after recovery from the abnormality.

Figure 5C:
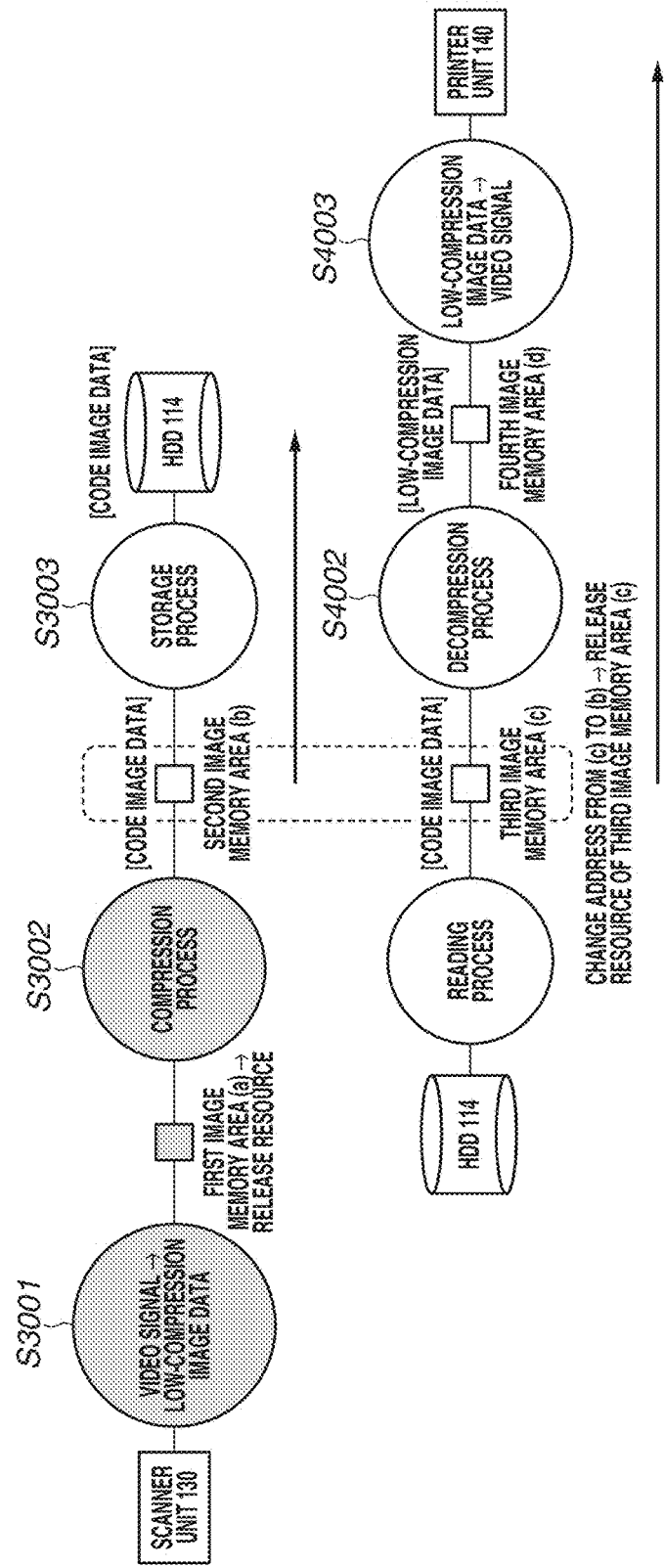

FIG. 5C illustrates the processing of the copy operation in a case where the print process is started in the phase of the scan process described with reference to FIG. 4C. In this phase of the copy process operation, the processes of steps S3001 and S3002 are completed, and the process of step S3003 is being executed. That is, in this phase, the resource of the second image memory area 122 is being used for the process of step S3003. In other words, in this phase, the resource of the second image memory area 122 has not yet been released. On the other hand, in this phase, the resource of the first image memory area 121 is released. Thus, in the copy process operation in FIG. 5C, the address (c) for referencing the third image memory area 123 is replaced with the address (b) for referencing the second image memory area 122. Then, in the process of step S4002, the code image data stored in the second image memory area 122 is read. That is, in the copy operation in FIG. 5C, the operation of the copy process is performed in the processes of steps S3001, S3002, S4002, and S4003.

That is, in the print process in FIG. 5C, the CPU 111 acquires the code image data stored in the second image memory area 122 and therefore can omit the process of step S4001 described with reference to FIG. 3B. Thus, it is possible to shorten the time until the printing of an image on a sheet is started, as compared to the case where all the processes of steps S4001 to S4003 are executed.

Further, in the scan process in FIG. 5C, to store code image data in the HDD 114, the processes are performed up to step S3003. The code image data is thus stored in the HDD 114, whereby, even if an abnormality occurs (for example, a print jam occurs) in the print process, it is possible to resume the print process after recovery from the abnormality.

FIG. 5D illustrates the processing of the copy operation in a case where the print process is started in the phase of the scan process described with reference to FIG. 4D. In this phase of the copy process operation, the processes of steps S3001, S3002, and S3003 are completed. That is, in this phase, the resource of the first image memory area 121 is released, and the resource of the second image memory area 122 is also released. Further, in this phase, code image data is stored in the HDD 114. Thus, in the copy operation in FIG. 5D, the address for referencing the image memory 120 is not replaced. That is, the CPU 111 reads the code image data stored in the HDD 114 and then performs the operation of the copy process in steps S4001, S4002, and S4003.

In the copy operation in FIG. 5D, without waiting for the completion of the reading of code image data of a document of a first page stored in the second image memory area 122, it is possible to store code image data of a document of a second page following the first page in the second image memory area 122. Thus, it is possible to prevent the start of the reading of the document at the second page following the first page from being delayed. Further, when the code image data stored in the second image memory area 122 is stored in the HDD 114, the resource of the second image memory area 122 is released. Consequently, an overflow does not occur in the image memory 120.

Next, with reference to a schematic diagram in FIG. 11A, a description is given of a timing chart of the copy operation in the phase of the copy operation described above with reference to FIG. 5A (this phase is hereinafter referred to as a "copy parallel processing mode").

Timing 1101 indicates the timing of copy job start upon the pressing of the start key.

Timing 1118 indicates the timing of output end of a print video.

It is assumed that in the MFP 103 according to the first exemplary embodiment, the speed of writing image data to the image memory 120 by reading documents is faster than the speed of reading image data from the image memory 120 for printing. In such an MFP 103 according to the first exemplary embodiment, the MFP 103 continues to operate in the copy parallel processing mode while the MFP 103 can operate in the copy parallel processing mode, thereby shortening the time required from the timing 1101 to the timing 1118.

Commands 1102, 1103, 1104, 1105, and 1106 are commands exchanged between the device I/F of the scanner unit 130 and the device I/F 116 of the controller unit 110. Further, these commands 1102 to 1106 are also commands for the controller unit 110 and the control unit of the scanner unit 130 to operate in synchronization with each other.

The command 1102 is a preparation request to pull in the documents 32. Upon the reception of the command 1102, the control unit of the scanner unit 130 performs initialization for the pulling in of the documents 32 stacked in the document tray 30.

The command 1103 is a reply command in response to the command 1102. The controller unit 110 receives the command 1103, thereby determining that preparation has been made for the pulling in of the documents 32. Upon the reception of the command 1103, the CPU 111 of the controller unit 110 sets the scan image path 3000 in FIG. 3A, which defines the order of image processing and the order of image areas for scanning.

The command 1104 is a start request for the pulling in of the documents 32. Upon the reception of the command 1104, the control unit of the scanner unit 130 starts the pulling in of the documents 32 stacked in the document tray 30.

The command 1105 is a reply command in response to the command 1104. The controller unit 110 receives the command 1105, thereby determining that the pulling in of the documents 32 has been started. At this time, the control unit of the scanner unit 130 may notify the controller unit 110 of information that the pulling in of the documents 32 has been normally started.

The command 1106 is a scan video request which requests input of a video signal of a scan image from the scanner unit 130. The command 1106 corresponds to a command with which the CPU 111 of the controller unit 110 instructs the scanner unit 130 to read the documents 32.

An interrupt 1107 is an interrupt to start a scan video. A notification of the interrupt 1107 is given, and then, a video signal of a scan image is continuously input to the controller unit 110. Then, the image processing unit 118 of the controller unit 110 carries out image processing of the video signal of the scan image input to the controller unit 110.

A video 1115 schematically represents the video signal of the scan image.

Timing 1116 indicates the end timing of the video signal of the scan image.

Commands 1110, 1111, and 1113 are commands exchanged between the printer unit 140 and the device I/F 116 of the controller unit 110.

The command 1110 is a start request to feed sheets. Upon the reception of the command 1110, the printer unit 140 starts feeding sheets held in the cassettes (351 to 354) or sheets held in the manual-feeding tray 350.

The command 1111 is a reply command in response to the command 1110. The controller unit 110 receives the command 1111, thereby determining that the feeding of sheets has been started.

The command 1113 is a print video request which requests to start output of a video signal of a print image to the printer unit 140. The command 1113 corresponds to a command with which the CPU 111 of the controller unit 110 instructs the printer unit 140 to perform printing.

An interrupt 1114 is an interrupt to start a print video. A notification of the interrupt 1114 is given, and then, a video signal of a print image is continuously input to the printer unit 140. Then, based on the video signal of the print image input to the printer unit 140, the printer unit 140 performs a printing operation.

A video 1117 schematically represents the video signal of the print image.

Events 1109 and 1112 indicate start events of the print process.

The event 1109 is a start event of print preparation. When the controller unit 110 receives the event 1109, a notification of the command 1110 is given to the printer unit 140. Further, upon the reception of the event 1109, as illustrated in FIG. 3B, the CPU 111 of the controller unit 110 sets the print image path 4000, which defines the order of image processing and the order of image areas for printing. Further, the CPU 111 sets, for the image processing unit 118, various parameters for performing the image processing described in steps S4001 to S4003 in FIG. 3B and secures resources to be reserved for the image memory areas of the image memory 120.

This operation is characterized in that when the MFP 103 is operating in the copy parallel processing mode, the command 1105 is received through scan-side processing, and then, a notification of the event 1109 is given through print-side processing.

The event 1112 is a start event of the print process. When the controller unit 110 receives the event 1112, a notification of the command 1113 is given to the printer unit 140. When a notification of the interrupt 1107 is given, the event 1112 occurs.

A schematic diagram in FIG. 11B illustrates a timing chart of the copy process operation in the phase of the copy process described above with reference to FIG. 5B. In the schematic diagram in FIG. 11B, events and commands similar to those in the operation of the copy parallel processing mode described above with reference to FIG. 11A are denoted by the same numbers, and are not described in detail here.

In the copy process operation in the phase of the copy process described above with reference to FIG. 5B, after the storage of image data in the first image memory area 121 is completed, a start event of print preparation is issued. Therefore, the controller unit 110 receives scan video corresponding to a predetermined image data size (i.e., at the timing 1116 or later) and then receives an event 1150, which is a start event of the print process. Then, after the controller unit 110 receives the event 1150, the commands 1110, 1111, and 1113 are sequentially exchanged between the printer unit 140 and the device I/F 116 of the controller unit 110.

As described above, in the copy parallel processing mode, it is possible to move up the start of preparation for the print process by the time interval from the occurrence of an interrupt for the start of a scan video, to the end timing of a video signal of a scan image (from 1107 to 1116), as compared with the copy process operation described above with reference to FIG. 5B.

It is assumed that in the MFP 103 according to the first exemplary embodiment the speed of writing image data to the image memory 120 through reading documents is faster than the speed of reading image data from the image memory 120 for printing. In such an MFP 103 according to the first exemplary embodiment, the MFP 103 continues to operate in the copy parallel processing mode while the MFP 103 can operate in the copy parallel processing mode, whereby it is possible to shorten the time required from the timing 1101 to the timing 1118.

Figure 6:
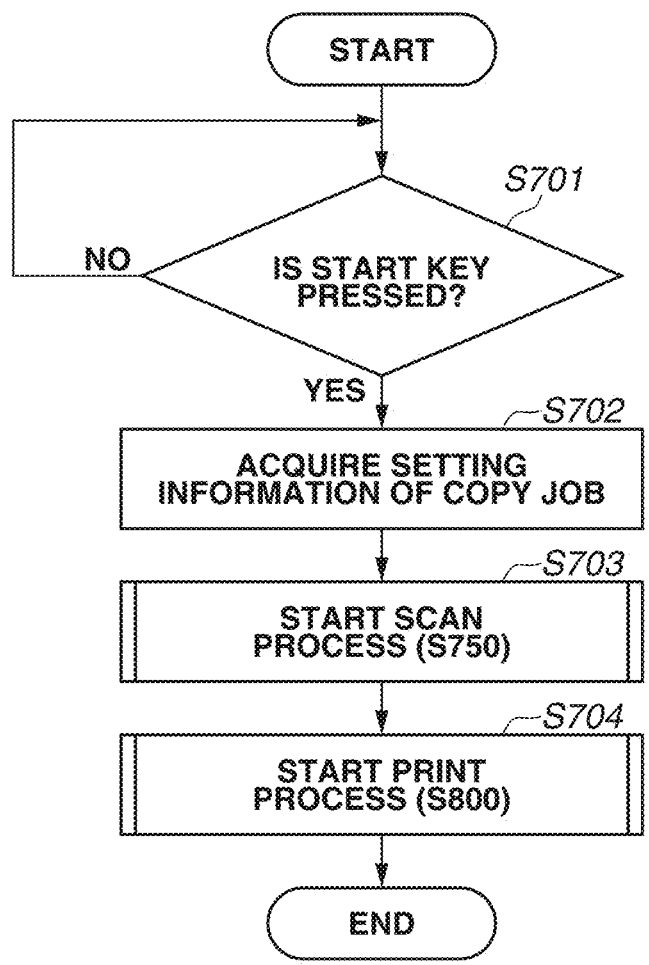
FIG. 6 is a flowchart illustrating the example of control according to the first exemplary embodiment.

Next, with reference to a flowchart illustrated in FIG. 6, a description is given of a series of processes in which the MFP 103 according to the first exemplary embodiment executes a copy job after receiving an execution instruction. This processing is performed by the CPU 111 executing a control program read from the ROM 113 or the HDD 114 and loaded into the RAM 112. The processing in FIG. 6 is started in the state where a screen for executing a copy process is displayed on the display unit of the operation unit 150.

First, in step S701, the CPU 111 determines whether the start key is pressed by the user through the operation unit 150. If it is determined that the start key is pressed (step S701: Yes), the processing proceeds to step S702. If, on the other hand, it is determined that the start key is not pressed (step S701: No), the process of step S701 is repeated until it is determined that the start key is pressed.

Next, in step S702, the CPU 111 acquires, from the HDD 114, setting information of a copy job (e.g., settings such as the number of copies, color selection, a magnification, sheet selection, page printing, a page layout, and bookbinding). It is assumed that before the start key is pressed in step S701, upon reception of the settings of a copy job from the user through the operation unit 150, setting information of the copy job is stored in the HDD 114.

Next, in step S703, the CPU 111 outputs a command instructing the scanner unit 130 to start a scan process (step S750) described below with reference to FIG. 7. Then, upon the reception of this instruction (referred to as a "scan instruction") from the CPU 111, the scanner unit 130 executes the scan process (step S750).

Then, if the controller unit 110 receives a start event of print preparation (the event 1109), then in step S704, the CPU 111 outputs to the printer unit 140 a command (corresponding to the command 1110) instructing the printer unit 140 to start a print process (step S800) described below with reference to FIG. 9 (including FIGS. 9A and 9B). Then, upon the reception of this instruction (referred to as a "print instruction") from the controller unit 110, the printer unit 140 executes the print process (step S800).

If the setting information of the copy job acquired in step S702 indicates particular values, the CPU 111 instructs the scanner unit 130 and the printer unit 140 to start the copy process by performing the scan process (step S750) and the print process (step S800) in parallel.

For example, if, as the setting information of the copy job, the magnification is "equal magnification", and the number of copies is specified as "one copy", and the color mode is not "automatic selection", and the sheet feeding stage is not "automatic selection", the CPU 111 causes the scanner unit 130 and the printer unit 140 to execute the copy process by performing the scan process (step S750) and the print process (step S800) in parallel.

The magnification is "equal magnification" when the user specifies the magnification as "100%", or for example, when the output sheet size is specified as A4 while the document size is A4. On the other hand, the magnification is not "equal magnification" (i.e., "variable magnification"), for example, when the user specifies the magnification as "86%", or when the output sheet size is specified as A3 while the document size is B4.

The color mode is "automatic selection" if the CPU 111 analyzes image data generated by reading documents, thereby determining whether the read documents are color or monochrome. If the user specifies read documents as "color" or "monochrome" in advance, the color mode is not "automatic selection".

The sheet feeding stage is "automatic selection" if a search is performed for the cassettes 351 to 354 holding sheets of the size that matches the output sheet size, and sheets are fed from the cassette holding the sheets of the size that matches the output sheet size. The output sheet size is determined based on, for example, the size of read documents and the magnification. On the other hand, the sheet feeding stage is not "automatic selection", for example, if the user specifies in advance the cassettes 351 to 354 or the manual-feeding tray 350 for feeding sheets to be output.

Figure 7:
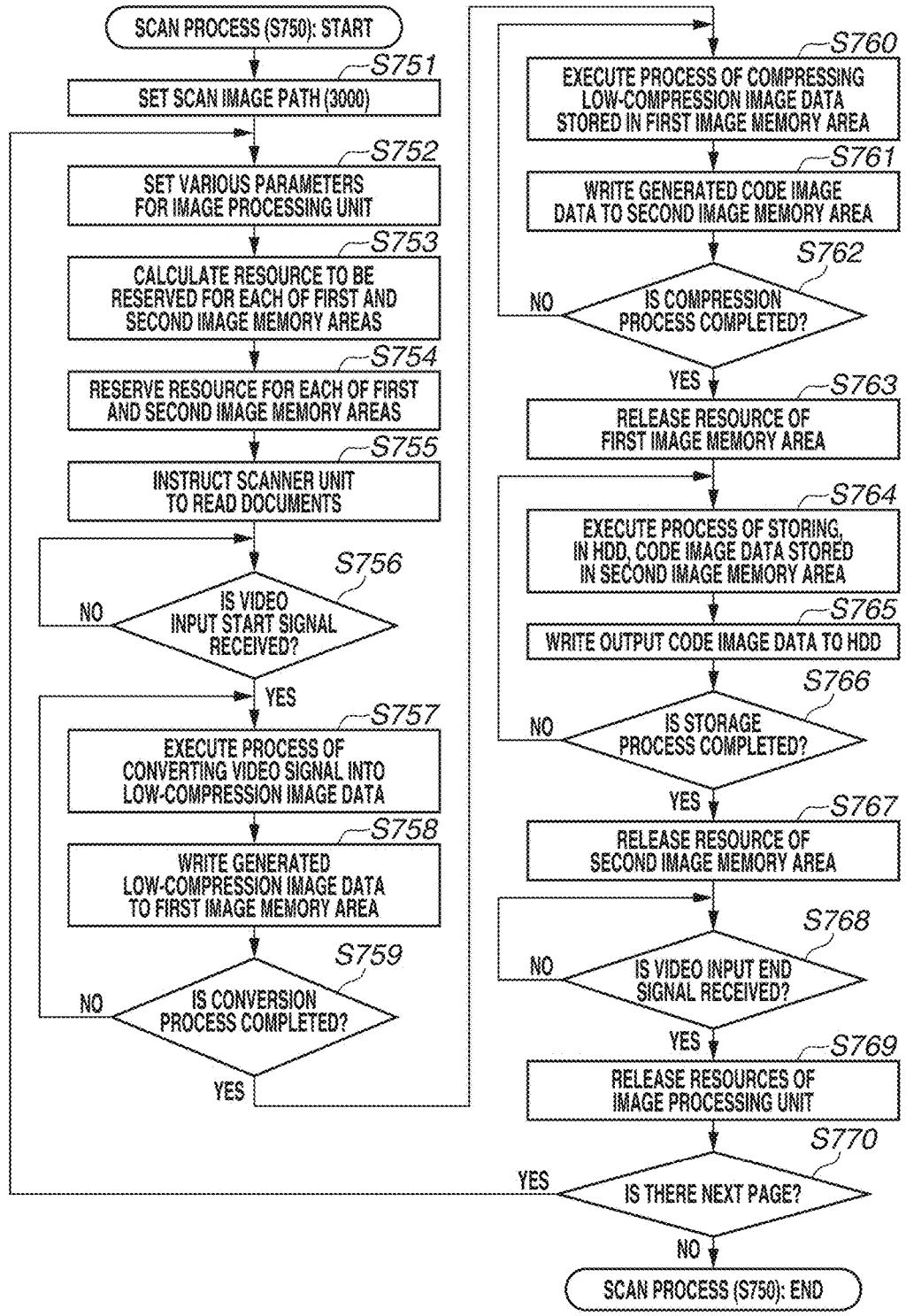
FIG. 7 is a flowchart illustrating the example of control according to the first exemplary embodiment.

Next, with reference to a flowchart illustrated in FIG. 7, a description is given of a series of processes (step S750) in which the MFP 103 according to the first exemplary embodiment executes the scan process for the copy job for which the execution instruction have been received. This processing is performed by the CPU 111 executing a control program read from the ROM 113 or the HDD 114 and loaded into the RAM 112.

First, in step S751, as illustrated in FIG. 3A, the CPU 111 sets the scan image path 3000, which defines the order of image processing and the order of image areas for scanning.

Next, in step S752, the CPU 111 sets, for the image processing unit 118, various parameters for performing the image processing described in steps S3001 to S3003 in FIG. 3A.

Next, in step S753, based on the various parameters set in step S752, the CPU 111 calculates a resource to be reserved for each of the first image memory area 121 and the second image memory area 122. A resource to be reserved for each of the first image memory area 121 and the second image memory area 122 is determined based on the data size of image data generated by reading documents. The data size of image data generated by reading documents depends on, for example, settings such as color, monochrome, a reading resolution, and the size of read documents.

Next, in step S754, based on the result of the calculation in the process of step S753, the CPU 111 reserves a resource for each of the first image memory area 121 and the second image memory area 122.

With reference to schematic diagrams illustrated in FIGS. 8A and 8B and 10A to 10C, a description is given of the reservation and the release of an area for storing data in the image memory 120.

First, with reference to the schematic diagrams illustrated in FIGS. 8A and 8B, memory control in the scan process is described.

FIG. 8A illustrates a state where as a result of the process of step S754, a resource for each of the first image memory area 121 and the second image memory area 122 is reserved in the image memory 120.

The first image memory area 121 is an area specified by, for example, an address "0x20000000". If the size of low-compression image data to be stored in the image memory 120 is 133 MBytes, an area of 133 MBytes from the address "0x20000000" is reserved.

The second image memory area 122 is an area specified by, for example, an address "0x70000000". If the size of code image data to be stored in the image memory 120 is 25 MBytes, an area of 25 MBytes from the address "0x70000000" is reserved.

The description returns to the flowchart illustrated in FIG. 7.

After the process of step S754 is executed, then in step S755, the CPU 111 outputs a command (corresponding to the command 1106) instructing the scanner unit 130 to read documents. Then, in step S755, upon the reception of the reading instruction from the CPU 111, the scanner unit 130 reads documents. Then, the CPU 111 receives the command 1105, and the processing proceeds to step S756. The controller unit 110 receives the command 1105, thereby determining that the pulling in of the documents 32 is started.

Next, in step S756, the CPU 111 waits for a video input start signal (corresponding to the interrupt 1107). This video input start signal is a hardware interrupt signal input from the scanner unit 130 to the image processing unit 118 via the device I/F 116. With this interrupt signal as a trigger, the input of a video signal of a scan image from the scanner unit 130 is started.

If, based on a notification of the interrupt 1107 sent to the CPU 111, the CPU 111 determines that a video input start signal is input (step S756: Yes), the processing proceeds to step S757. If, on the other hand, it is determined that a video input start signal is not input (step S756: No), the process of step S756 is repeated until a notification of the interrupt 1107 is given (i.e., until a video input start signal is input).

Next, in step S757, the CPU 111 executes the process of converting the video signal into low-compression image data via the image processing unit 118.

Next, in step S758, the CPU 111 writes to the first image memory area 121 the low-compression image data generated in the process of step S757.

Next, in step S759, the CPU 111 determines whether the conversion process executed in step S757 is completed. If it is determined that the conversion process is completed (step S759: Yes), the processing proceeds to step S760. If, on the other hand, it is determined that the conversion process is not completed (step S759: No), the processing returns to step S757.

Next, in step S760, the CPU 111 executes the process of compressing the low-compression image data stored in the first image memory area 121 via the compression/decompression unit 119.

Next, in step S761, the CPU 111 writes to the second image memory area 122 the code image data generated in step S760.

Next, in step S762, the CPU 111 determines whether the compression process executed in step S760 is completed. If it is determined that the compression process is completed (step S762: Yes), the processing proceeds to step S763. If, on the other hand, it is determined that the compression process is not completed (step S762: No), the processing returns to step S760.

Next, in step S763, the CPU 111 releases the resource of the first image memory area 121 reserved in step S754. The resource of the first image memory area 121 is released when a command output from the CPU 111 (a command to release a resource in the image memory 120) is received. In other words, the resource of the first image memory area 121 is not released until a command output from the CPU 111 (a command to release a resource in the image memory 120) is received. As a variation, the resource of the first image memory area 121 may be released when a command (a command to release a resource in the image memory 120) is output from the CPU 111.

The description returns to the schematic diagrams illustrated in FIGS. 8A and 8B.

FIG. 8B illustrates a state where as a result of the process of step S763, only the resource of the second image memory area 122 is reserved in the image memory 120, and the resource of the first image memory area 121 is released from the image memory 120. Consequently, for example, the first image memory area 121 specified by the address "0x20000000" can be assigned as a resource in the image memory 120 to a scan process of another page. The description returns to the flowchart illustrated in FIG. 7.

After the process of step S763 is executed, then in step S764, the CPU 111 executes the process of storing in the HDD 114 the code image data stored in the second image memory area 122.

Next, in step S765, the CPU 111 writes to the HDD 114 the code image data output from the second image memory area 122.

Next, in step S766, the CPU 111 determines whether the storage process executed in step S764 is completed. If it is determined that the storage process is completed (step S766: Yes), the processing proceeds to step S767. If, on the other hand, it is determined that the storage process is not completed (step S766: No), the processing returns to step S764.

Next, in step S767, the CPU 111 releases the resource of the second image memory area 122 reserved in step S754. The resource of the second image memory area 122 is released when a command output from the CPU 111 (a command to release a resource in the image memory 120) is received. In other words, the resource of the second image memory area 122 is not released until a command output from the CPU 111 (a command to release a resource in the image memory 120) is received. As a variation, the resource of the second image memory area 122 may be released when a command (a command to release a resource in the image memory 120) is output from the CPU 111.

Next, in step S768, the CPU 111 waits for a video input end signal output from the image processing unit 118. This video input end signal is a hardware interrupt signal internally generated by the image processing unit 118 based on the parameters set in step S752.

If it is determined that a video input end signal is input (step S768: Yes), the processing proceeds to step S769. If, on the other hand, it is determined that a video input end signal is not input (step S768: No), the process of step S768 is repeated until a video input signal is input.

Next, in step S769, the CPU 111 releases the resources of the image processing unit 118 used for the above scan process.

Next, in step S770, the CPU 111 determines whether there is a next page. The next page refers to a document of a second page or later. For example, if a page (a document) to be scanned by the scanner unit 130 is left, the CPU 111 determines that there is a next page (step S770: Yes), and the processing returns to step S752. If, on the other hand, it is determined that there is no next page (step S770: No), the series of processes (step S750) regarding the scan process ends.

A case has been described in step S763, where, if the compression process executed in step S760 is completed, the CPU 111 releases the resource of the first image memory area 121. The present invention, however, is not limited to such an embodiment.

Alternatively, even if the compression process executed in step S760 is completed, the CPU 111 may not release the resource of the first image memory area 121, and when a document at a next page is read to generate image data, the CPU 111 may release the resource of the first image memory area 121. That is, the CPU 111 may not release the resource of the first image memory area 121 reserved for the previous page, until it is determined that a video input start signal of a next page is input.

Further, a case has been described in step S767 where if the storage process executed in step S764 is completed, the CPU 111 releases the resource of the second image memory area 122. The present invention, however, is not limited to such an embodiment.

Alternatively, even if the storage process executed in step S764 is completed, the CPU 111 may not release the resource of the second image memory area 122, and when a document at a next page is read to generate image data, the CPU 111 may release the resource of the second image memory area 122. That is, the CPU 111 may not release the resource of the second image memory area 122 reserved for the previous page, until it is determined that a video input start signal of a next page is input.

Yet alternatively, at the timing of reserving resources in the image memory 120 for a next page, the CPU 111 may release the resources in the image memory 120 (the first image memory area 121 and the second image memory area 122) reserved for the previous page.

Next, with reference to a flowchart illustrated in FIG. 12, a description is given of a series of processes performed in the MFP 103 according to the first exemplary embodiment, where the control unit of the scanner unit 130 executes the scan process of the copy job. This processing is performed by the CPU of the control unit of the scanner unit 130 executing a control program read from the ROM of the scanner unit 130 and loaded into the RAM of the scanner unit 130.

First, in step S1201, the CPU of the control unit of the scanner unit 130 waits for a preparation request (corresponding to the command 1102) for the pulling in of the documents 32. Upon the reception of the command 1102, the CPU of the control unit of the scanner unit 130 determines that a notification of a preparation request for the pulling in of the documents 32 is given (step S1201: Yes), and the processing proceeds to step S1202. The process of step S1201 is repeated until the command 1102 is received.

Next, in step S1202, the CPU of the control unit of the scanner unit 130 executes a start process of the scanner unit 130.

Next, in step S1203, the CPU of the control unit of the scanner unit 130 waits for a start request (corresponding to the command 1104) for the pulling in of the documents 32. Upon the reception of the command 1104, the CPU of the control unit of the scanner unit 130 determines that a notification of a start request for the pulling in of the documents 32 is given (step S1203: Yes), and the processing proceeds to step S1204. The process of step S1203 is repeated until the command 1104 is received.

Next, in step S1204, the CPU of the control unit of the scanner unit 130 starts to pull in the documents 32 placed in the document tray 30. At this time, the CPU of the control unit of the scanner unit 130 outputs the command 1105, and the CPU 111 of the controller unit 110 receives the command 1105. Consequently, the pulling in of the documents 32 is started.

Next, in step S1205, the CPU of the control unit of the scanner unit 130 determines whether a scan video request (corresponding to the command 1106) is received from the controller unit 110. Upon the reception of the command 1106, the CPU of the control unit of the scanner unit 130 determines that a request for input of a video signal of a scan image from the scanner unit 130 is received (step S1205: Yes), and the processing proceeds to step S1206. The process of step S1205 is repeated until the command 1106 is received.

Next, in step S1206, the CPU of the control unit of the scanner unit 130 outputs to the controller unit 110 an interrupt signal (corresponding to the interrupt 1107) indicating the start of the video. Consequently, in step S756 described above with reference to FIG. 7, the CPU 111 determines the input start signal is received and Yes.

Next, in step S1207, the CPU of the control unit of the scanner unit 130 determines whether the video signal of the scan image ends. If it is determined that the video signal of the scan image ends (step S1207: Yes), the processing proceeds to step S1208. If, on the other hand, it is determined that the video signal of the scan image does not end (step S1207: No), the process of step S1207 is repeated until the video signal of the scan image ends.

In step S1208, the CPU of the control unit of the scanner unit 130 outputs to the controller unit 110 an interrupt signal indicating the end of the video signal of the scan image. Then, in step S1209, the CPU of the control unit of the scanner unit 130 determines whether there is a next page. The next page refers to a document 32 at a second page or later. For example, if a document 32 is left and placed in the document tray 30, the CPU of the control unit of the scanner unit 130 determines that there is a next page (step S1209: Yes), and the processing returns to step S1203. If, on the other hand, a document 32 is not left and placed in the document tray 30, the CPU of the control unit of the scanner unit 130 determines that there is no next page (step S1209: No). Then, in step S1210, the CPU of the control unit of the scanner unit 130 executes a predetermined end process. Then, after the process of step S1210, the series of processes by the control unit of the scanner unit 130 for executing the scan process of the copy job ends.

Next, with reference to a flowchart illustrated in FIG. 9 (including FIGS. 9A and 9B), a description is given of a series of processes (step S800) by the MFP 103 according to the first exemplary embodiment for executing the print process of the copy job for which the execution instruction is received. This processing is performed by the CPU 111 executing a control program read from the ROM 113 or the HDD 114 and loaded into the RAM 112.

Upon the reception of the command 1110, the printer unit 140 executes the processes of steps S801 to S804.

First, in step S801, as illustrated in FIG. 3B, the CPU 111 sets the print image path 4000, which defines the order of image processing and the order of image areas for printing.

Next, in step S802, the CPU 111 sets, for the image processing unit 118, various parameters for performing the image processing described in steps S4001 to S4003 in FIG. 3B.

Next, in step S803, based on the various parameters set in step S802, the CPU 111 calculates a resource to be reserved for each of the third image memory area 123 and the fourth image memory area 124. A resource to be reserved for each of the third image memory area 123 and the fourth image memory area 124 is determined based on the data size of image data generated by reading documents. The data size of image data generated by reading documents depends on, for example, settings such as color, monochrome, a reading resolution, and the size of read documents.

Next, in step S804, based on the result of the calculation in step S803, the CPU 111 secures a resource to be reserved for each of the third image memory area 123 and the fourth image memory area 124.

With reference to the schematic diagrams illustrated in FIGS. 10A to 10C, memory control in the print process is described.

FIG. 10A illustrates a state where in the image memory 120, resources are reserved for the first image memory area 121 and the second image memory area 122, and then, a resource is further reserved for each of the third image memory area 123 and the fourth image memory area 124.

The third image memory area 123 is an area specified by, for example, an address "0x80000000". If the size of code image data to be stored in the image memory 120 is 25 MBytes, an area of 25 MBytes from the address "0x80000000" is reserved.

The fourth image memory area 124 is an area specified by, for example, an address "0x90000000". If the size of low-compression image data to be stored in the image memory 120 is 133 MBytes, an area of 133 MBytes from the address "0x90000000" is reserved.

The size of an area to be reserved in the image memory 120 for the first image memory area 121 and the fourth image memory area 124 is the same, and the size of an area to be reserved in the image memory 120 for the second image memory area 122 and the third image memory area 123 is the same.

The description returns to the flowchart illustrated in FIG. 9 (including FIGS. 9A and 9B).

After the process of step S804 is executed, then in step S805, the CPU 111 outputs a command (corresponding to the command 1113) instructing the printer unit 140 to perform printing.

Next, in step S806, the CPU 111 waits for a video output start signal (corresponding to the interrupt 1114). This video output start signal is a hardware interrupt signal input from the printer unit 140 to the image processing unit 118 via the device I/F 116.

Next, in step S807, the CPU 111 determines whether the resource of the first image memory area 121 is released. If it is determined that the resource is released (step S807: Yes), the processing proceeds to step S813. If, on the other hand, it is determined that the resource is not released (step S807: No), the processing proceeds to step S808.

If low-compression image data of a document at the same page is stored in the first image memory area 121, the CPU 111 determines that the resource of the first image memory area 121 is not released (step S807: No). If, on the other hand, low-compression image data of the document at the same page is not stored in the first image memory area 121, the CPU 111 determines that the resource of the first image memory area 121 is released (step S807: Yes).

Alternatively, if a command to release a resource in the image memory 120 is output, the CPU 111 may determine that the resource of the first image memory area 121 is released (step S807: Yes). If, on the other hand, a command to release a resource in the image memory 120 is not output, the CPU 111 may determine that the resource of the first image memory area 121 is not released (step S807: No).

First, the processes of step S808 and thereafter are described.

In step S808, the CPU 111 changes the address for reading low-compression image data from the image memory 120, from the address (d) for referencing the fourth image memory area 124 to the address (a) for referencing the first image memory area 121.

The description returns to the schematic diagrams illustrated in FIGS. 10A to 10C.

FIG. 10B illustrates a state where in the process of step S808, as the address for reading low-compression image data from the image memory 120, the address "0x90000000" is replaced with the address "0x20000000". This enables the CPU 111 to, as preprocessing for outputting a video signal to the printer unit 140, read low-compression image data stored in an area specified by the address "0x20000000" (i.e., the first image memory area 121).

The description returns to the flowchart illustrated in FIG. 9 (including FIGS. 9A and 9B).

After the process of step S808 is executed, then in step S809, the CPU 111 releases the resources of the third image memory area 123 and the fourth image memory area 124 reserved in step S804. Upon the reception of a command output from the CPU 111 (a command to release a resource in the image memory 120), the resources of the third image memory area 123 and the fourth image memory area 124 are released. In other words, the resources of the third image memory area 123 and the fourth image memory area 124 are not released until a command output from the CPU 111 (a command to release a resource in the image memory 120) is received. As a variation, the resources of the third image memory area 123 and the fourth image memory area 124 may be released when a command (a command to release a resource in the image memory 120) is output from the CPU 111.

The description returns to the schematic diagrams illustrated in FIGS. 10A to 10C.

FIG. 10C illustrates a state where the resources of the first image memory area 121 and the second image memory area 122 are reserved in the image memory 120, and the resources of the third image memory area 123 and the fourth image memory area 124 are released from the image memory 120. Consequently, for example, the third image memory area 123, which is specified by the address "0x80000000", can be assigned as a resource in the image memory 120 for a scan process of another page. Further, for example, the fourth image memory area 124, which is specified by the address "0x90000000", can be assigned as a resource in the image memory 120 to a scan process of another page.

The description returns to the flowchart illustrated in FIG. 9 (including FIGS. 9A and 9B).

After the process of step S809 is executed, then in step S810, the CPU 111 executes the process of converting the low-compression image data stored in the first image memory area 121 into a video signal via the image processing unit 118.

Next, in step S811, the CPU 111 outputs to the printer unit 140 the video signal generated in the process of step S809.

Next, in step S812, the CPU 111 determines whether the conversion process executed in step S809 is completed. If it is determined that the conversion process is completed (step S812: Yes), the processing proceeds to step S830. If, on the other hand, it is determined that the conversion process is not completed (step S812: No), the processing returns to step S810.

Next, the processes of step S813 and thereafter are described.

In step S813, the CPU 111 determines whether the resource of the second image memory area 122 is released. If it is determined that the resource of the second image memory area 122 is released (step S813: Yes), the processing proceeds to step S819. If, on the other hand, it is determined that the resource of the second image memory area 122 is not released (step S813: No), the processing proceeds to step S814.

If code image data of a document at the same page is stored in the second image memory area 122, the CPU 111 determines that the resource of the second image memory area 122 is not released (step S813: No). If, on the other hand, code image data of the document at the same page is not stored in the second image memory area 122, the CPU 111 determines that the resource of the second image memory area 122 is released (step S813: Yes).

Alternatively, if a command to release a resource in the image memory 120 is output, the CPU 111 may determine that the resource of the second image memory area 122 is released (step S813: Yes). If, on the other hand, a command to release a resource in the image memory 120 is not output, the CPU 111 may determine that the resource of the second image memory area 122 is not released (step S813: No).

In step S814, the CPU 111 changes the address for reading code image data from the image memory 120, from the address (c) for referencing the third image memory area 123 to the address (b) for referencing the second image memory area 122.

Next, in step S815, the CPU 111 releases the resource of the third image memory area 123 reserved in step S804. Upon the reception of a command output from the CPU 111 (a command to release a resource in the image memory 120), the resource of the third image memory area 123 is released. In other words, the resource of the third image memory area 123 is not released until a command output from the CPU 111 (a command to release a resource in the image memory 120) is received. As a variation, the resource of the third image memory area 123 may be released when a command (a command to release a resource in the image memory 120) is output from the CPU 111.

Next, in step S816, the CPU 111 executes the process of decompressing the code image data stored in the second image memory area 121 via the compression/decompression unit 119.

Next, in step S817, the CPU 111 writes to the fourth image memory area 124 the low-compression image data generated in the process of step S816.

Next, in step S818, the CPU 111 determines whether the decompression process executed in step S815 is completed. If it is determined that the decompression process is completed (step S818: Yes), the processing proceeds to step S826. If, on the other hand, it is determined that the decompression process is not completed (step S818: No), the processing returns to step S816.

Next, the processes of step S819 and thereafter are described.

In step S819, the CPU 111 executes the process of reading code image data from the HDD 114.

Next, in step S820, the CPU 111 writes to the third image memory area 123 the code image data read in step S819.

Next, in step S821, the CPU 111 determines whether the reading process executed in step S819 is completed. If it is determined that the reading process is completed (step S821: Yes), the processing proceeds to step S822. If, on the other hand, it is determined that the reading process is not completed (step S821: No), the processing returns to step S819.

Next, in step S822, the CPU 111 executes the process of decompressing the code image data stored in the third image memory area 123 via the compression/decompression unit 119.

Next, in step S823, the CPU 111 writes to the fourth image memory area 124 the low-compression image data generated in step S821.

Next, in step S824, the CPU 111 determines whether the decompression process executed in step S822 is completed. If it is determined that the decompression process is completed (step S824: Yes), the processing proceeds to step S825. If, on the other hand, it is determined that the decompression process is not completed (step S824: No), the processing returns to step S822.

Next, in step S825, the CPU 111 releases the resource of the third image memory area 124 reserved in step S804. Upon the reception of a command output from the CPU 111 (a command to release a resource in the image memory 120), the resource of the third image memory area 123 is released. In other words, the resource of the third image memory area 123 is not released until a command output from the CPU 111 (a command to release a resource in the image memory 120) is received. As a variation, the resource of the third image memory area 123 may be released when a command (a command to release a resource in the image memory 120) is output from the CPU 111.

Next, the processes of step S826 and thereafter are described.

In step S826, the CPU 111 executes the process of converting the low-compression image data stored in the fourth image memory area 124 into a video signal via the image processing unit 118.

Next, in step S827, the CPU 111 outputs to the printer unit 140 the video signal generated in step S826.

Next, in step S828, the CPU 111 determines whether the conversion process executed in step S826 is completed. If it is determined that the conversion process is completed (step S828: Yes), then in step S829, the CPU 111 releases the resource of the fourth image memory area 124 reserved in step S804. Upon the reception of a command output from the CPU 111 (a command to release a resource in the image memory 120), the resource of the fourth image memory area 124 is released. In other words, the resource of the fourth image memory area 124 is not released until a command output from the CPU 111 (a command to release a resource in the image memory 120) is received. As a variation, the resource of the fourth image memory area 124 may be released when a command (a command to release a resource in the image memory 120) is output from the CPU 111.

Next, the processes of step S830 and thereafter are described.

In step S830, based on the video signal (i.e., image data) output in the process of step S811 or S827, the printer unit 140 prints an image on a sheet.

Next, in step S831, the CPU 111 waits for a video output end signal output from the image processing unit 118. This video output end signal is a hardware interrupt signal internally generated by the image processing unit 118 based on the parameters set in step S802. If it is determined that a video output end signal is input (step S831: Yes), the processing proceeds to step S832. If, on the other hand, it is determined that a video output end signal is not input (step S831: No), the process of step S831 is repeated until a video output end signal is input.

Next, in step S832, the CPU 111 releases the resources of the image processing unit 118 used for the above print process.

Next, in step S833, the CPU 111 determines whether there is a next page. For example, if a page to be printed by the printer unit 140 is left, the CPU 111 determines that there is a next page (step S833: Yes), and the processing returns to step S802. If, on the other hand, it is determined that there is no next page (step S833: No), the series of processes (step S800) regarding the print process ends.

In the first exemplary embodiment, the MFP 103 is described in which copying of documents having a plurality of pages is executed and the speed of writing image data to the image memory 120 through reading documents is faster than the speed of reading image data from the image memory 120 to make prints.

In the example of control described with reference to FIG. 9 (including FIGS. 9A and 9B), when the copying of documents having a plurality of pages is executed, image data stored in the image memory 120 is read until printing based on the image data stored in the image memory 120 cannot be executed, to make prints based on the read image data. Further, in the example of control described with reference to FIG. 9 (including FIGS. 9A and 9B), when the copying of documents having a plurality of pages is executed, if printing based on image data stored in the image memory 120 cannot be executed, image data stored in the HDD 114 is read, and printing based on the read image data is executed.

Consequently, even if the speed of writing image data to the image memory 120 through reading documents is faster than the speed of reading image data from the image memory 120 to make prints, it is possible to prevent an overflow from occurring in the image memory 120.

As described above, in the first exemplary embodiment to which the present invention is applied, a printing apparatus stores, in a first storage unit (e.g., the image memory 120), image data generated by reading a plurality of documents. Next, the printing apparatus stores, in a second storage unit (e.g., the HDD 114), image data read from the first storage unit. Then, the printing apparatus executes printing based on the image data stored in either one of the first and second storage units.

Until printing based on image data of documents stored in the first storage unit cannot be executed, the printing apparatus executes printing based on the image data of the documents stored in the first storage unit. If, on the other hand, printing based on the image data of the documents stored in the first storage unit cannot be executed, the printing apparatus executes printing based on image data of documents stored in the second storage unit. Under such control, when the copying of documents having a plurality of pages is executed, an overflow does not occur in a storage unit such as the image memory 120. Further, it is possible to shorten the processing time for reading the documents having the plurality of pages, and executing printing based on image data generated by reading the documents having the plurality of pages.

A second exemplary embodiment is described below. In the first exemplary embodiment, an example has been described where the resources of the first image memory area 121 and the second image memory area 122 are reserved for a scan process, and the resources of the third image memory area 123 and the fourth image memory area 124 are reserved for a print process.

Also in the second exemplary embodiment, the resources of the first image memory area 121 and the second image memory area 122 are reserved for a scan process. On the other hand, in the second exemplary embodiment, an example is described where for a print process, the resource of the third image memory area 123 is reserved, but the resource of the fourth image memory area 124 is not reserved.

Similar to the first exemplary embodiment, it is assumed that also in the MFP 103 according to the second exemplary embodiment, the speed of writing image data to the image memory 120 through reading documents is faster than the speed of reading image data from the image memory 120 to make prints.

In an example of control according to the second exemplary embodiment, a portion of processes is different from the example of control according to the first exemplary embodiment. Thus, the processes different from those in the first exemplary embodiment are mainly described with reference to FIGS. 13, 14A, and 14B. The processes similar to those described in the first exemplary embodiment are denoted by the same step numbers, and are not described in detail here.

First, with reference to a schematic diagram illustrated in FIG. 13, a description is given of a series of processes (steps S4001, S9002, and S9003) from reading of data from the image memory 120 or the HDD 114, until output of a video signal to the printer unit 140.

The CPU 111 sets a print image path 9000 illustrated in FIG. 13, which defines the order of image processing and the order of image areas for printing. Then, after setting the print image path 9000, the CPU 111 executes the processes of steps S4001, S9002, and S9003. The CPU 111 sets various parameters for the image processing unit 118 to perform image processing described in steps S4001, S9002, and S9003.

In step S9002, the compression/decompression unit 119 decompresses the code image data stored in the third image memory area 123, thereby generating low-compression image data. At this time, the generated low-compression image data is not stored in the fourth image memory area 124. This is because in the second exemplary embodiment, when a print process is started, the resource of the third image memory area 123 is reserved, but the resource of the fourth image memory area 124 is not reserved.

In step S9003, the low-compression image data generated in step S9002 is converted into a video signal, and the video signal is output to the printer unit 140. That is, in the second exemplary embodiment, the process of converting low-compression image data generated by decompressing code image data into a video signal is performed not via the image memory 120.

Figure 14A:
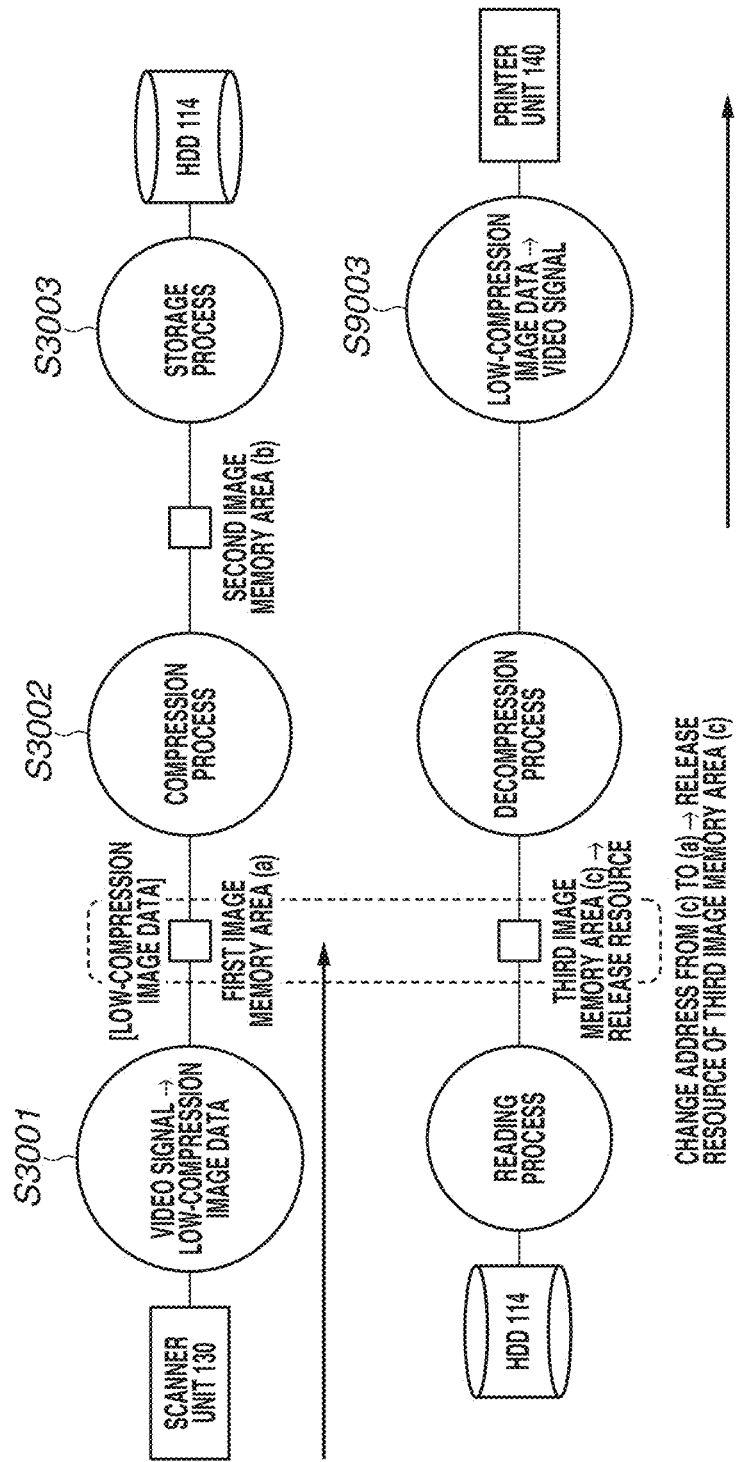
FIGS. 14A and 14B are schematic diagrams illustrating the example of control according to the second exemplary embodiment.
Figure 14B:
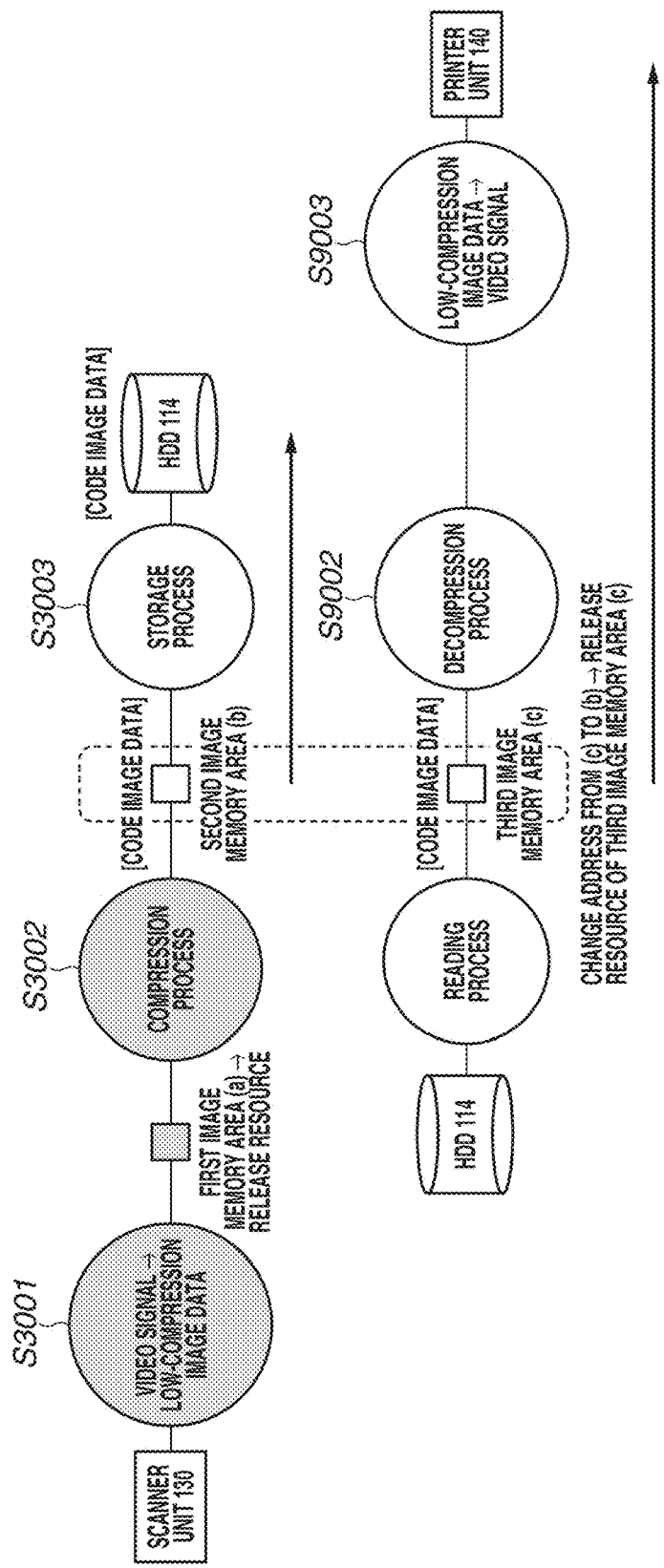

Next, with reference to schematic diagrams in FIGS. 14A and 14B, a description is given of the processing order in a case where, at the time of operating a copy process, the MFP 103 according to the second exemplary embodiment causes a scan process and a print process to operate in parallel.

Further, in the operation of the copy process in the second exemplary embodiment, a setting is made such that the address (c) for referencing the third image memory area 123 can be replaced with the address (a) for referencing the first image memory area 121.

Further, in the operation of the copy process in the second exemplary embodiment, a setting is made such that the address (c) for referencing the third image memory area 123 can be replaced with the address (b) for referencing the second image memory area 122.

FIG. 14A illustrates the processing of a copy operation in a case where the print process is started in the phase of the scan process described with reference to FIG. 4A. In this phase of the copy operation, the address (c) for referencing the third image memory area 123 is replaced with the address (a) for referencing the first image memory area 121.

In the process of step S9003, the CPU 111 reads the low-compression image data stored in the first image memory area 121 and then sets, in the image processing unit 118, parameters for a decompression process according to the compression ratio of the read low-compression image data. Then, based on the parameters for the decompression process, the CPU 111 decompresses the low-compression image data stored in the first image memory area 121 via the compression/decompression unit 119. Then, the CPU 111 converts the low-compression image data of a new compression ratio which is generated in this decompression process, into a video signal and outputs the converted video signal to the printer unit 140.

That is, in the copy process operation in FIG. 14A, the operation of the copy process is performed in the processes of steps S3001 and S9003. Thus, it is possible to omit the process of step S4001 described with reference to FIG. 3B. Thus, it is possible to shorten the time until the printing of an image on a sheet is started.

FIG. 14B illustrates the processing of the copy operation in a case where the print process is started in the phase of the scan process described with reference to FIG. 4C. In this phase of the copy operation, the processes of steps S3001 and S3002 are completed, and the process of step S3003 is being executed. That is, in this phase, the resource of the second image memory area 122 is being used for the process of step S3003. In other words, in this phase, the resource of the second image memory area 122 has not yet been released. On the other hand, in this phase, the resource of the first image memory area 121 is released. Thus, in the copy operation in FIG. 14B, the address (c) for referencing the third image memory area 123 is replaced with the address (b) for referencing the second image memory area 122.

In the process of step S9002, the CPU 111 reads the code image data stored in the second image memory area 122 and then decompresses the compressed code image data via the compression/decompression unit 119. Then, in the process of step S9003, the CPU 111 converts the low-compression image data generated in the process of step S9002 into a video signal and then outputs the converted video signal to the printer unit 140.

That is, in the copy operation in FIG. 14B, the copy process is performed in the processes of steps S3001, S3002, S9002, and S9003. Thus, it is possible to omit the process of step S4001 described with reference to FIG. 3B. Thus, it is possible to shorten the time until the printing of an image on a sheet is started.

In the second exemplary embodiment, the MFP 103 executes the copying of documents having a plurality of pages in which the speed of writing image data to the image memory 120 through reading documents is faster than the speed of reading image data from the image memory 120 to make prints.

In the example of control described with reference to FIGS. 14A and 14B, when the copying of documents having a plurality of pages is executed, image data stored in the image memory 120 is read until printing based on the image data stored in the image memory 120 cannot be executed, to make prints based on the read image data. Further, in the example of control described with reference to FIG. 5B, when the copying of documents having a plurality of pages is executed, if printing based on image data stored in the image memory 120 cannot be executed, image data stored in the HDD 114 is read, and printing based on the read image data is executed.

Consequently, even if the speed of writing image data to the image memory 120 through reading documents is faster than the speed of reading image data from the image memory 120 for printing, it is possible to prevent an overflow from occurring in the image memory 120.

In the second exemplary embodiment to which the present invention is applied, for a print process, the resource of the third image memory area 123 is reserved, but the resource of the fourth image memory area 124 is not reserved. That is, in the second exemplary embodiment to which the present invention is applied, the process of converting low-compression image data generated by decompressing code image data into a video signal is performed not via the image memory 120.

Under such control, when the copying of documents having a plurality of pages is executed, an overflow does not occur in a storage unit such as the image memory 120. Further, it is possible to shorten the processing time for reading the documents having the plurality of pages, and executing printing based on image data generated by reading the documents having the plurality of pages.

Other Exemplary Embodiments

The present invention is not limited to the above exemplary embodiments. Various modifications (including the organic combinations of the exemplary embodiments) can be made based on the spirit of the present invention, and are not excluded from the scope of the present invention.

For example, in the present exemplary embodiments, the CPU 111 of the controller unit of the MFP 103 performs the above various types of control. The present invention, however, is not limited to these embodiments. Alternatively, a print control apparatus such as an external controller having a housing separate from the MFP 103 may perform some or all of the above various types of control.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-095884, filed May 8, 2015, and No. 2015-144395, filed Jul. 21, 2015, which are hereby incorporated by reference herein in their entirety.

What is claimed is:

1. A printing apparatus comprising:
   a reader configured to read an image on a document and generate image data;
   a first memory configured to store image data for at least one page generated by the reader reading the image on the document;
   a second memory configured to store image data obtained by compressing the image data stored in the first memory;
   a printer configured to print an image; and
   at least one processor,
   wherein the at least one processor is configured to execute:
      reserving, in the first memory, an area for storing image data of one page generated by the reader reading the image on the document;
      storing, in the area reserved in the first memory, image data generated by the reader reading the image on the document;
      storing, in the second memory, image data obtained by compressing the image data stored in the area;
      releasing the reserved area after completion of storing, in the second memory, the image data stored in the reserved area;
      determining whether or not the reserved area for storing the image data of the one page to be printed by the printer has been released; and
      causing the printer to perform printing based on the image data of the one page stored in the reserved area in a case where the reserved area for storing the image data of the one page to be used for printing has not been released, and causing the printer to perform printing based on the image data of the one page stored in the second memory in a case where the reserved area for storing the image data of the one page to be used for printing has been released.

2. The printing apparatus according to claim 1, wherein before image data for a single page generated by the reader reading the document is stored in the first memory, the printer prints an image, using the image data stored in the first memory.

3. The printing apparatus according to claim 1, wherein the at least one processor is configured to execute:
   compressing the image data stored in the first memory, and storing the compressed image data in the first memory again; and
   releasing the area for storing the image data that has not been compressed yet, after completing storing the compressed image data in the first memory, and
   storing, in the first memory, new image data to be generated by the reader reading the document after releasing the reserved area.

4. The printing apparatus according to claim 1, wherein a speed of storing image data of a document read by the reader in the first memory is faster than a speed of reading print target image data from the first memory.

5. The printing apparatus according to claim 1, wherein, while the image data stored in the second memory is being decompressed and stored in the first memory, the reader newly reads a document.

6. The printing apparatus according to claim 1, wherein the at least one processor is configured to execute:
   outputting a command to release the area reserved for storing the image date generated by the reader reading the document; and
   receiving the output command; and
   determining that the area in the first memory is released based on to the output command being received.

7. The printing apparatus according to claim 1, wherein the at least one processor is configured to execute:
   outputting a command to release the area reserved for storing the image date generated by the reader reading the document;
   receiving the output command; and
   determining that the area in the first memory is released based on to output of the command.

8. The printing apparatus according to claim 1, wherein the first memory stores image data compressed at a first compression ratio, and
wherein the second memory stores image data compressed at a compression ratio higher than the first compression ratio.

9. A method for controlling an image reading apparatus including a reader configured to read an image on a document, a first memory configured to store image data for at least one page generated by the reader reading the document, a second memory configured to store image data obtained by compressing the image data stored in the first memory, and a printer configured to print an image, the method comprising:
reading an image on a document by the reader;
reserving, in the first memory, an area for storing image data of one page to be generated by the reader reading the image on the document;
storing, in the reserved area, image data generated by the reader reading the document;
storing, in the second memory, image data obtained by compressing the image data of one page stored in the first memory;
releasing the area reserved in the first memory according to completion of storing, in the second memory, the compressed image data of one page;
determining whether or not the area reserved in the first memory for storing the image data of the one page to be printed by the printer has been released; and
printing an image based on the image data stored in the reserved area in the first memory in a case where the reserved area has not been released, and causing the printer to printing an image based on the image data stored in the second memory in a case where the reserved area has been released.

10. A computer-readable storage medium storing a program for causing a computer to execute a method for controlling an image reading apparatus including a reader configured to read an image on a document, a first memory configured to store image data for at least one page generated by the reader reading the document, the second memory configured to store image data obtained by compressing the image data stored in the first memory, and a printer configured to print an image, the program comprising:
a code to cause a reader to read an image on a document;
a code to reserve, in the first memory, an area for storing image data of one page to be generated by the reader reading the image on the document;
a code to store, in the reserved area, image data generated by causing the reader to read the document;
a code to store, in the second memory, image data obtained by compressing the image data of the one page stored in the first memory;
a code to release the area reserved in the first memory after completion of storing, in the second memory, the compressed image data of one page;
a code to determine whether or not the reserved area has been released; and
a code to cause the printer to print an image based on the image data of one page stored in the reserved area in a case where the reserved area for storing the image data to be printed has not been released, and cause the printer to print an image based on image data stored in the second memory in a case where the reserved area for storing the image data to be printed has been released.

11. The printing apparatus according to claim 1, wherein the first memory releases the area used for storing the image data of one page after the second memory stores the image data compressed completely, and the first storage device stores new image data.

12. The printing apparatus according claim 1, wherein the at least one processor is configured to execute:
in a case where the reserved area for storing the image data of the one page to be printed by the printer has not been released, set an address of the area of the first memory as an address to be used for reading the image to be printed by the printer.

* * * * *